US009063209B2

(12) United States Patent
Ku et al.

(10) Patent No.: US 9,063,209 B2
(45) Date of Patent: Jun. 23, 2015

(54) LOCATION TRACKING SYSTEM AND METHOD OF WIRELESS DEVICE USING WIRELESS LAN ACCESS POINT

(75) Inventors: Kyojun Ku, Yongin-si (KR); Sunghak Song, Seongnam-si (KR); Taeho Kim, Yongin-si (KR); Kyung Eun Woo, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 1046 days.

(21) Appl. No.: 12/940,219

(22) Filed: Nov. 5, 2010

(65) Prior Publication Data

US 2011/0103360 A1 May 5, 2011

(30) Foreign Application Priority Data

| Nov. 5, 2009 | (KR) | 10-2009-0106674 |
| Nov. 20, 2009 | (KR) | 10-2009-0112514 |
| Nov. 27, 2009 | (KR) | 10-2009-0115696 |

(51) Int. Cl.
*H04W 4/00* (2009.01)
*G01S 5/02* (2010.01)

(52) U.S. Cl.
CPC .............. *G01S 5/021* (2013.01); *G01S 5/0252* (2013.01)

(58) Field of Classification Search
CPC .............................. H04W 84/12; H04W 84/02
USPC ....................................................... 370/338
See application file for complete search history.

(56) References Cited

U.S. PATENT DOCUMENTS

| 6,304,218 B1 | 10/2001 | Sugiura et al. |
| 6,697,615 B1 | 2/2004 | Takemura |
| 7,551,579 B2 | 6/2009 | Alizadeh-Shabdiz et al. |
| 2002/0198977 A1 | 12/2002 | Cho |
| 2006/0172699 A1 | 8/2006 | Goto |
| 2007/0258421 A1 | 11/2007 | Alizadeh-Shabdiz et al. |

FOREIGN PATENT DOCUMENTS

| EP | 2144078 A1 | 1/2010 |
| JP | 2001119334 A | 4/2001 |

(Continued)

OTHER PUBLICATIONS

Search Report dated Jun. 6, 2011 from the European Patent Office in counterpart application No. 10190185.8.

(Continued)

*Primary Examiner* — Shripal Khajuria
(74) *Attorney, Agent, or Firm* — Sughrue Mion, PLLC

(57) ABSTRACT

Provided are real time location tracking system and method of a wireless device using a wireless LAN AP, the system and method include measuring intensities of APs that are currently detected by the wireless device of which location is to be estimated, collecting ADD, constructing RDLE including locations, a list of APs corresponding to the locations, signal intensities of the APs, and reliabilities of the APs, storing the RDLE, comparing the RDLE with the ADD, and estimating the location of the wireless device, which realizes seamless location tracking technology indoors and outdoors, thereby providing a variety of location tracking services.

12 Claims, 21 Drawing Sheets

(56) References Cited

FOREIGN PATENT DOCUMENTS

| | | |
|---|---|---|
| JP | 200743574 A | 2/2007 |
| JP | 2007-232592 A | 9/2007 |
| JP | 2009536809 A | 10/2009 |
| JP | 2010-127843 A | 6/2010 |
| KR | 10-2009-0066571 | 6/2009 |
| WO | 2004/080105 A2 | 9/2004 |
| WO | 2008/069446 A1 | 6/2008 |

OTHER PUBLICATIONS

Korean Office Action dated Jan. 19, 2012 issued in Korean Application No. 10-2009-0112514.

Communication dated May 10, 2012 issued by the Japanese Patent Office in counterpart Japanese Application No. 2010-248735.

Communication dated Nov. 20, 2012 issued by the Japanese Patent Office in counterpart Japanese Application No. 2010-248735.

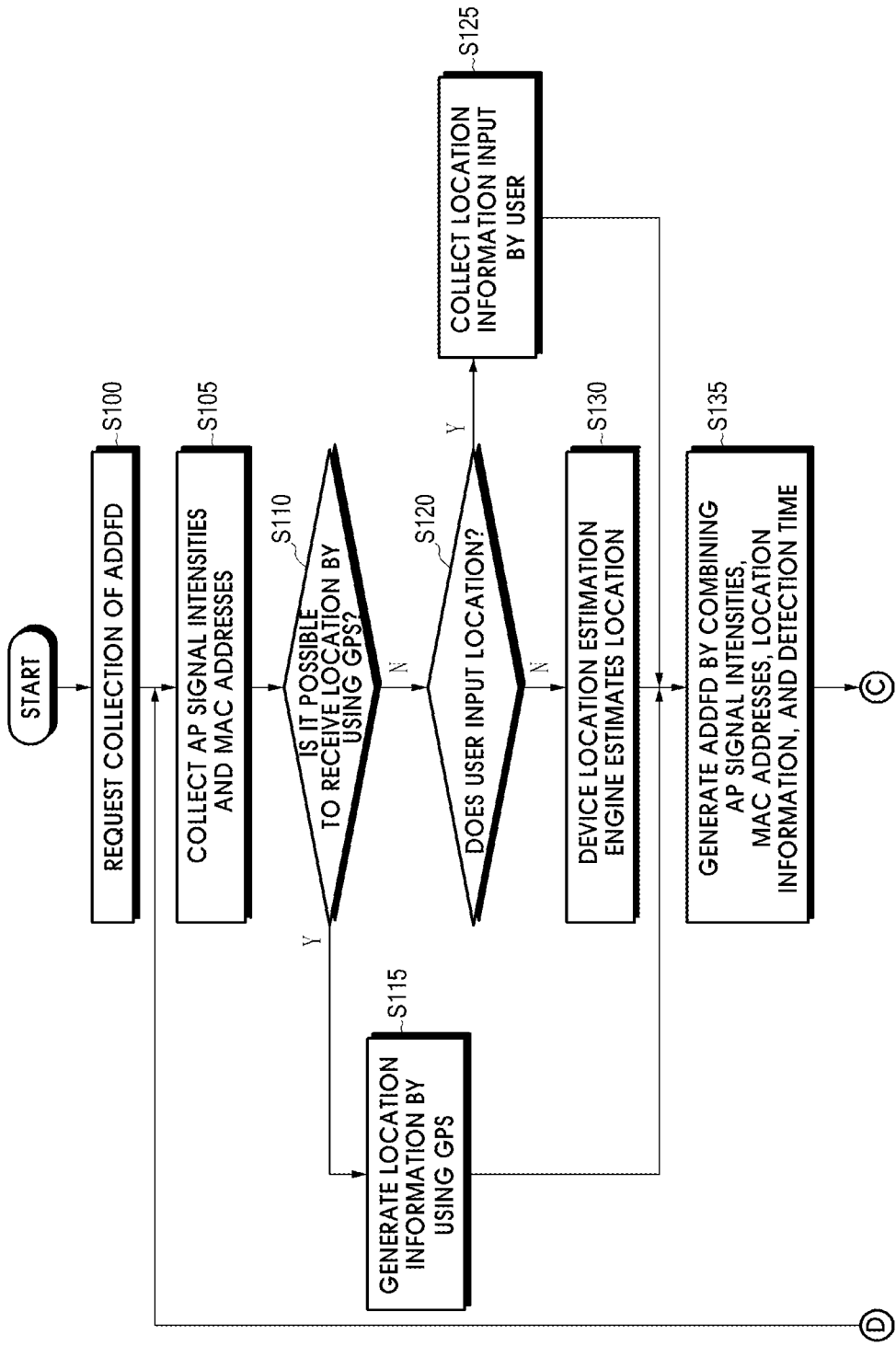

LOCATION TRACKING SYSTEM AND METHOD OF WIRELESS DEVICE USING WIRELESS LAN ACCESS POINT

CROSS-REFERENCE TO RELATED PATENT APPLICATION

This application claims the benefit of Korean Patent Application No. 10-2009-0106674, filed on Nov. 5, 2009, Korean Patent Application No. 10-2009-0112514, filed on Nov. 20, 2009, and Korean Patent Application No 10-2009-0115696, filed on Nov. 27, 2009, in the Korean Intellectual Property Office, the disclosures of which are incorporated herein in their entireties by reference.

BACKGROUND OF THE INVENTION

1. Field of the Invention

The present invention relates to a location tracking system and method of a wireless device using a wireless LAN access point (AP), and more particularly to, a location tracking system and method of a wireless device using a wireless LAN AP that provides a seamless location tracking service having high reliability indoors and outdoors, and secures reference data for location tracking having high reliability.

2. Description of the Related Art

Conventional location tracking technologies of utilizing intensities of wireless LAN signals of an access point (AP) were widely known. To realize the location tracking technologies of utilizing intensities of wireless LAN signals, first, an operation of scanning location tracking data, and, second, an operation of tracking a user's actual location by using the scanned data are necessary.

Conventional scanning technologies must continuously perform the operation of scanning location tracking based data before the operation of tracking the user's location is performed. During the scanning operation, users who are carrying devices with a global positioning system (GPS) store information regarding APs at a corresponding GSP coordinate point in a database. More specifically, to provide a location tracking service, a service provider scans regions whose location tracking is desired, collects data regarding APs of the scanned regions, and configures a database before the location tracking service is provided. Alternatively, users who are carrying devices with a GPS scan regions whose location tracking is desired and upload data regarding the scanned data. Further, after a specific region is initially scanned, since an AP construction environment of the specific region is changed according to time, using of old data deteriorates accuracy of location tracking. Thus, repetitive scanning operations are required to reflect a new AP construction environment.

As described above, the conventional technologies must continuously repeat an operation of scanning the same region after the location tracking service is provided, which increases maintenance and repair expenses. The more the region covered by the location tracking service extends, the greater the maintenance and repair expenses rapidly increase.

SUMMARY OF THE INVENTION

The present invention provides real time location tracking system and method of a wireless device using a reliability based wireless LAN access point (AP) that provide a seamless location tracking service having high reliability indoors and outdoors, a method of constructing reference data for location estimation (RDLE) used in the real time location tracking system and method, and a location estimation server.

The present invention also provides real time location tracking system and method of a wireless device using a reliability based wireless LAN AP that secure RDLE having high reliability, a method of constructing RDLE used in the real time location tracking system and method, and a location estimation server.

The present invention also provides a computer readable recording medium having recorded thereon a program for executing a method of providing a seamless location tracking service having high reliability indoors and outdoors and securing RDLE having high reliability.

The present invention also provides a database used in a real time location tracking system and method of a wireless device using a reliability based wireless LAN AP that provide a seamless location tracking service having high reliability indoors and outdoors and secure RDLE having high reliability.

The present invention also provides wireless LAN based seamless location tracking system and method between indoors and outdoors that determine indoors and outdoors via a wireless LAN only and perform seamless location tracking without using a technology requiring an additional resource, such as a global positioning system (GPS), a mobile communication network, an indoor server, etc., thereby reducing expenses incurred in building an infrastructure and manufacturing a terminal, and a wireless device used in the wireless LAN based seamless location tracking system and method.

The present invention also provides a computer readable recording medium having recorded thereon a program for executing a wireless LAN based seamless location tracking method between indoors and outdoors that determines indoors and outdoors via a wireless LAN only and performs seamless location tracking without using a technology requiring an additional resource, such as a global positioning system (GPS), a mobile communication network, an indoor server, etc., thereby reducing expenses incurred in building an infrastructure and manufacturing a terminal.

According to an aspect of the present invention, there is provided a reference data for location estimation (RDLE) construction method, the method comprising: receiving access point (AP) scan data including a list of APs, signal intensities of the APs, and locations where the AP scan data is measured; calculating reliabilities of at least one of the AP scan data and the locations; and storing the RDLE including the calculated reliabilities, the AP scan data, and the locations that correspond to each other.

According to another aspect of the present invention, there is provided a real time location tracking method of a wireless device, the method comprising: receiving ADD including a list of APs (hereinafter referred to as "first APs") and signal intensities of the first APs measured by the wireless device of which location is to be estimated; and estimating a location of the wireless device by comparing RDLE including locations, a list of APs (hereinafter referred to as "second APs") corresponding to the locations, signal intensities of the second APs, and reliabilities of the second APs with the ADD.

According to another aspect of the present invention, there is provided a location estimation server for constructing RDLE for location tracking of a wireless device, the location estimation server comprising: an ADD receiver for receiving AP scan data including a list of APs and signal intensities of the APs measured by the wireless device, and locations where the AP scan data is measured; an RDLE reliability calculation engine for calculating reliabilities of at least one of the AP scan data and the locations; and a location data construction engine for constructing the RDLE including the calculated reliabilities, the AP scan data, and the locations that correspond to each other.

According to another aspect of the present invention, there is provided a wireless LAN based seamless location tracking system between indoors and outdoors, the system comprising: an ADD collecting unit for collecting ADD including signal intensities of APs and identification information of the APs; an indoor and outdoor location identification data extracting unit for extracting data (hereinafter referred to as "KAS data") used to identify indoors and outdoors from an AP list for each location; and an indoor and outdoor location determining unit for comparing the ADD collected by the ADD collecting unit with the KAS data and determining whether a wireless device is indoors or outdoors.

According to another aspect of the present invention, there is provided a wireless LAN based seamless location tracking method between indoors and outdoors, the system comprising: collecting ADD including signal intensities of APs and identification information of the APs; extracting data (hereinafter referred to as "KAS data") used to identify indoors and outdoors from an AP list for each location; and comparing the collected ADD with the KAS data and determining whether a wireless device is indoors or outdoors.

According to another aspect of the present invention, there is provided a wireless device capable of wireless LAN based seamless location tracking between indoors and outdoors, the wireless device comprising: an ADD collecting unit for collecting ADD including signal intensities of APs and identification information of the APs; and an indoor and outdoor location determining unit for comparing the ADD collected by the ADD collecting unit with data used to identify indoors and outdoors and determining whether a wireless device is indoors or outdoors.

BRIEF DESCRIPTION OF THE DRAWINGS

The above and other features and advantages of the present invention will become more apparent by describing in detail exemplary embodiments thereof with reference to the attached drawings in which:

FIGS. 8A and 8B are flowcharts of a process of collecting ADDFD in the wireless device of FIG. 5 according to an embodiment of the present invention;

DETAILED DESCRIPTION OF THE INVENTION

Figure 1:
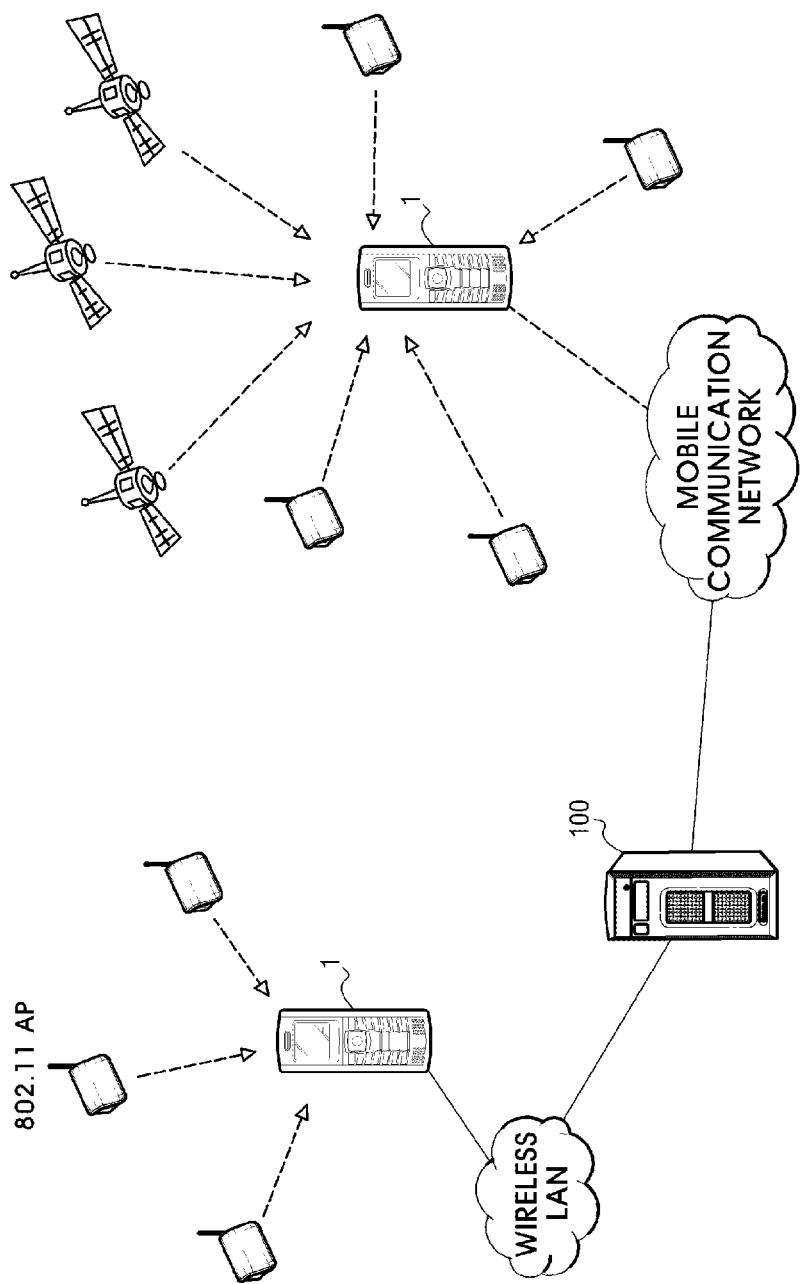
FIG. 1 is a configuration diagram of a real time location tracking system according to an embodiment of the present invention.

Hereinafter, the present invention will be described in detail by explaining embodiments of the invention with reference to the attached drawings. As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

Definition of Terms

"Reference data for location estimation (RDLE)" is data directly used to estimate a location by a wireless device or a location estimation server, and may include a plurality of "subsets of reference data for location estimation (SRDLE)".

The "RDLE" may mean "access point (AP) detection data for DB construction", "statistical data" generated from the "AP detection data for DB construction", or "statistical data" in which reliability is reflected after removing data having low reliability from the "statistical data" generated from the "AP detection data for DB construction". In the present specification, the term "RDLE" is used to encompass all of the "AP detection data for DB construction", the "statistical data", and the "statistical data" reflecting reliability, unless practicable benefits are particularly distinguished.

The "SRDLE" is constructed to include a location, an AP list, and intensities of AP signals, or to include a location, an AP list, intensities of AP signals, and reliability.

"AP detection data for DB construction (ADDFD)" is data used to generate the RDLE, and includes a predetermined location, intensities of signals of APs measured at the predetermined location, and identification information of the APs measured at the predetermined location.

"AP detection data (ADD)" is data collected by a wireless device to perform location estimation of the wireless device, and may include intensities of AP signals, identification information of APs, and/or signals for detecting the AP signals.

A "segment" means a region divided according to a predetermined standard.

An "AP list" means data including at least intensities of AP signals and identification information of APs.

A "key AP set (KAS)" is an AP list that is able to identify specific indoors and outdoors. A single KAS corresponds to single indoors and means data including at least one or more sub KASs (SKASs).

"AP information for each location" is an AP list for each location irrespective of identification of indoors and outdoors.

A "SKAS" is an AP list for each segment in specific indoors.

Figure 2:
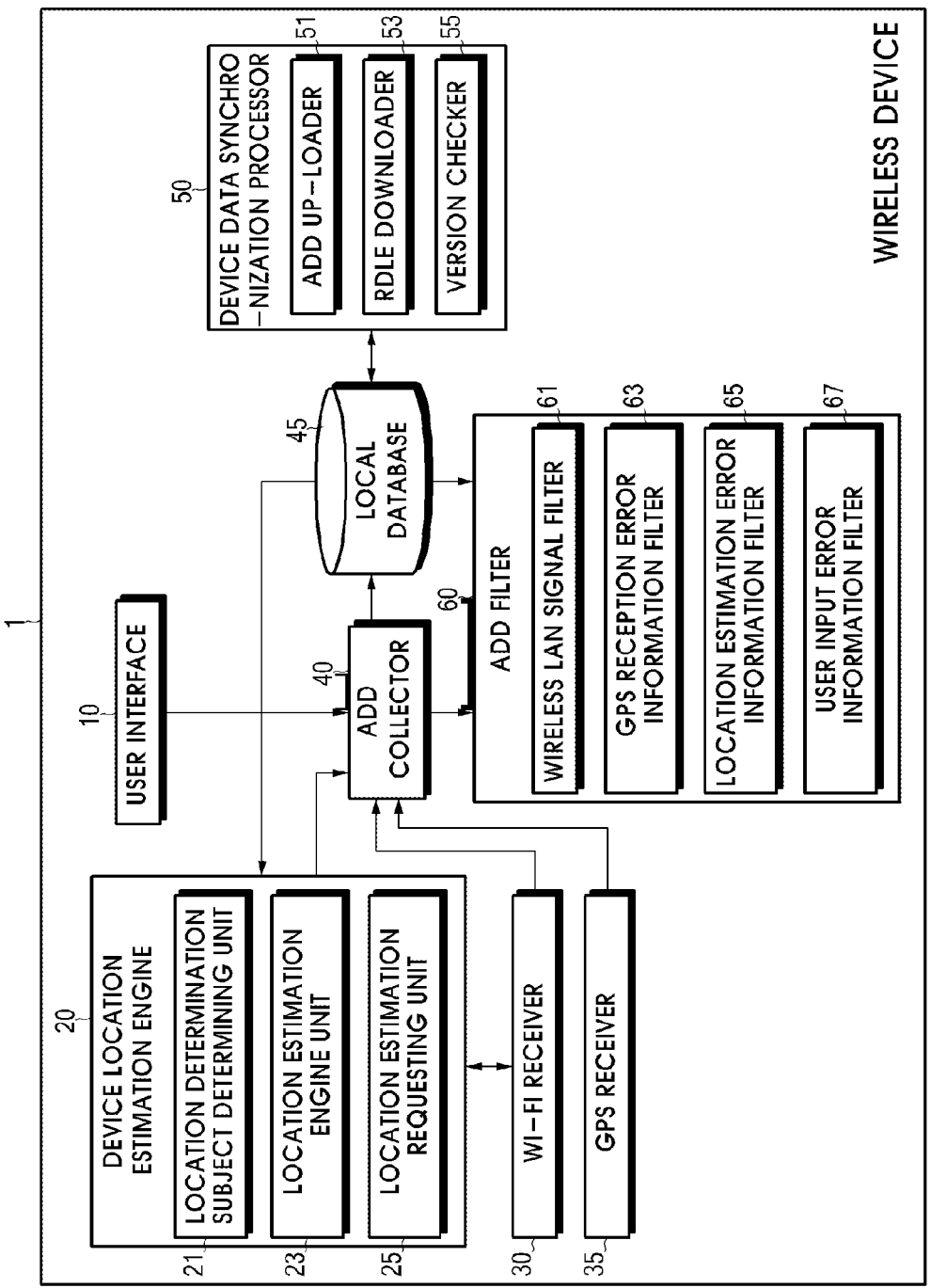
FIG. 2 is a block diagram of a wireless device of FIG. 1.
Figure 3:
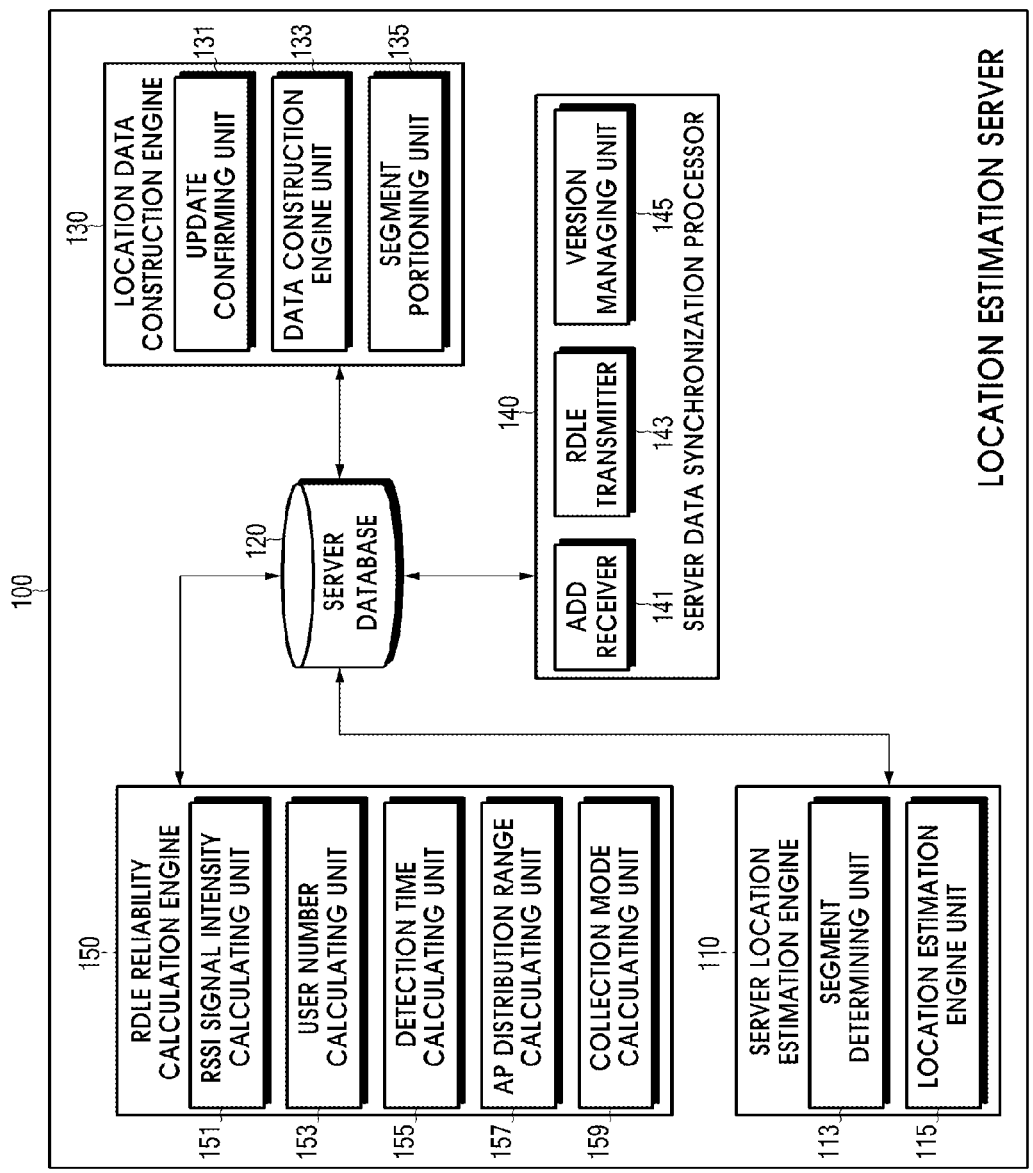
FIG. 3 is a block diagram of a location estimation server of FIG. 1.

FIG. 1 is a configuration diagram of a real time location tracking system according to an embodiment of the present invention. FIG. 2 is a block diagram of a wireless device 1 of FIG. 1. FIG. 3 is a block diagram of a location estimation server 100 of FIG. 1.

The real time location tracking system of the present embodiment may include the wireless device 1 and the location estimation server 100.

The wireless device 1 may receive signals from the wireless LAN APs and collect AP detection data for DB construction (ADDFD) or AP detection data (ADD).

The location estimation server 100 may construct reference data for location estimation (RDLE), store the RDLE, compare the ADD with the RDLE, and estimate a location of the wireless device 1.

The wireless device 1 of the present embodiment may include an ADD collector 40, an ADD filter 60, a local database 45, a device location estimation engine 20, a device data synchronization processor 50, a user interface 10, a GPS receiver 35, and a Wi-Fi receiver 30.

Meanwhile, although the wireless device 1 of the present embodiment includes the GPS receiver 35, the GPS receiver 35 may not be included in the wireless device 1. Further, although the wireless device 1 of the present embodiment includes the ADD filter 60, the ADD filter 60 may not be included in the wireless device 1.

The ADD collector 40 may collect the ADDFD and/or the ADD. The ADD filter 60 may remove indefinite data from the ADDFD and/or the ADD collected by the ADD collector 40 and smooth intensities of AP signals.

The ADDFD and the ADD will now be described in detail below.

i) Collection of ADDFD

The ADDFD collected by the wireless device 1 is transmitted to the location estimation server 100 and is generated as the RDLE.

The ADD collector 40 may generate the ADDFD by collecting intensities of the signals received from the wireless LAN APs, current location information of the wireless device 1, and receivable MAC addresses of the wireless LAN APs. The ADDFD may further include a detection time that may be used to calculate reliability.

The ADD collector 40 receives the signal intensities and MAC addresses of the wireless LAN APs from the Wi-Fi receiver 30, and receives location information of the wireless device 1 from at least one of the GPS receiver 35, the user interface 10, and the device location estimation engine 20.

If the Wi-Fi receiver 30 receives a request to collect the ADDFD from a user, the Wi-Fi receiver 30 may scan the signals of the wireless LAN APs, receive the scanned signals of the wireless LAN APs, and measure intensities of the received wireless LAN AP signals. The Wi-Fi receiver 30 may identify MAC addresses of the received signals of the wireless LAN APs and transfer the identified MAC addresses (hereinafter referred to as an "AP list") and the measured intensities of the signals of the wireless LAN APs to the ADD collector 40. In this regard, the MAC addresses of the wireless LAN APs may be used to identify the wireless LAN APs.

The GPS receiver 35 may receive satellite signals from a plurality of satellites and measure a location of the wireless device 1. If the wireless device 1 is located outdoors, the GPS receiver 35 may be used to measure the location of the wireless device 1 and transfer information regarding the location of the wireless device 1 to the ADD collector 40.

The user interface 10 may provide an input/output interface used to directly receive the location of the wireless device 1 from a user of the wireless device 1. If the wireless device 1 is generally located in a building, it is difficult to obtain the location information of the wireless device 1 by using the GPS receiver 35. Thus, if the wireless device 1 is located in the building, the user may directly input the location of the wireless device 1 through the user interface 10. The location information of the wireless device 1 input through the user interface 10 is transferred to the ADD collector 40.

Further, the device location estimation engine 20 may estimate the location of the wireless device 1 and transfer the estimated location to the ADD collector 40. The device location estimation engine 20 is an element employed to collect the location information of the wireless device 1 when the wireless device 1 does not include the GPS receiver 35. However, even when the wireless device 1 includes the GPS receiver 35, the device location estimation engine 20 may be employed by the wireless device 1. In this case, the device location estimation engine 20 and/or the GPS receiver 35 may collect information.

The device location estimation engine 20 may estimate the location of the wireless device 1 by using the signal intensities and list of the APs received from the Wi-Fi receiver 30, and the RDLE. A process of estimating the location of the wireless device 1 in the device location estimation engine 20 will be described in more detail later.

The ADD filter 60 may receive the data collected by the ADD collector 40 and remove indefinite data from the received data. The data from which indefinite data is removed is stored in the local database 45. In the present specification, the ADDFD that is not filtered by the ADD filter 60 and the ADDFD that is filtered by the ADD filter 60 are comprehensibly referred to as the ADDFD, unless particularly distinguished.

Meanwhile, according to another embodiment, the ADD filter 60 may not be included in the wireless device 1. In this case, the data collected by the ADD collector 40 may skip the ADD filter 60 and may be directly stored in the local database 45.

The ADDFD may include the signal intensities of the wireless LAN APs, the location of the wireless device 1, and the AP list. Further, the ADDFD may further include time taken to measure the signal intensities of the wireless LAN APs. The time may be used to calculate reliability, which will be described later.

The ADD filter 60 of the present embodiment may perform at least one or more operations of the following operations of:
 a. filtering collected wireless LAN AP signals;
 b. filtering location information received by the GPS receiver 35;
 c. filtering location information estimated by the device location estimation engine 20;
 d. filtering location information input by the user; and
 e. smoothing the filtered wireless LAN AP signals.

Meanwhile, both the ADDFD and the ADD may be filtered by the ADD filter 60. That is, the ADD filter 60 may filter the ADDFD and the ADD that is collected to estimate the location of the wireless device 1. Meanwhile, the ADD filter 60 may smooth the signal intensities of the wireless LAN APs when filtering the ADDFD and the ADD.

The ADD filter 60 of the present embodiment may include a wireless LAN signal filter 61, a GPS reception error information filter 63, a location estimation error information filter 65, and/or a user input error information filter 67.

The wireless LAN signal filter 61 may filter the wireless LAN signals collected by the Wi-Fi receiver 30. The GPS reception error information filter 63 may filter the location information collected by the GPS receiver 35.

The location estimation error information filter 65 may filter the location information estimated by the device location estimation engine 20. The user input error information filter 67 may filter the location information input by the user.

As will be described later, the location estimation server 100 of the present embodiment may separately manage a list (hereinafter referred to as an "AP delete list") of APs having low reliability that are removed from the ADDFD. The wireless LAN signal filter 61 may filter the wireless LAN signals collected by the Wi-Fi receiver 30 by using the AP delete list.

The GPS reception error information filter 63 may remove a GPS satellite value smaller than a previously set threshold.

The location estimation error information filter 65 may remove indefinite data from the location estimated by the device location estimation engine 20. The location estimation error information filter 65 may remove, for example, a physically impossible location (e.g. a sudden change from LA to New York) estimated by the device location estimation engine 20.

The user input error information filter 67 is a filter for removing a location that is erroneously input by the user, other than a current location of the user.

The data filtered as described above is stored in the local database 45 and is uploaded to the location estimation server 100.

The signal intensities of the wireless LAN APs, the location of the wireless device 1, and the MAC addresses of the wireless LAN APs included in the ADDFD correspond to each other as listed in Table 1 below.

TABLE 1

| Detection Location | AP Identification Information (MAC Address) | Intensity of Signal (RSSI) |
|---|---|---|
| P1: (127,37) | AP(a): 00:99:1a:22:b3:35 | −80 |
| | AP(b): 00:63:1a:22:b5:b3 | −65 |
| | AP(c): 00:00:1a:22:b3:35 | −79 |
| P2: (127, 38) | AP(b): 00:63:1a:22:b5:b3 | −70 |
| | AP(c): 00:00:1a:22:b3:35 | −85 |
| P3: (127,39) | AP(b): 00:63:1a:22:b5:b3 | −70 |
| | AP(c): 00:00:1a:22:b3:35 | −75 |
| | AP(d): 00:00:1a:22:b3:37 | −80 |
| | AP(e): 00:00:1a:22:b3:38 | −85 |
| P4: (127,40) | AP(c): 00:00:1a:22:b3:35 | −65 |
| | AP(d): 00:00:1a:22:b3:37 | −70 |
| | AP(e): 00:00:1a:22:b3:38 | −80 |
| | AP(f): 00:00:1a:22:b3:39 | −75 |

In accordance with Table 1 above, a list of APs that receive signals at a detection location P1 includes an AP(a), an AP(b), and an AP(c) that have signal intensities of −80, −65, and −79, respectively. A list of APs that receive signals at a detection location P2 includes the AP(b) and the AP(c) that have signal intensities of −70 and −85, respectively. Other detection locations P3 and P4 may apply in the same manner as the detection locations P1 and P2. The ADDFD includes the lists of APs capable of receiving signals at the detection locations P1 through P4 and intensities of the signals. As an option, the ADD collector 40 may further include detection time in the ADD.

ii) Collection of ADD

The ADD is compared to previously constructed RDLE and is used to determine the location of the wireless device 1. The ADD collector 40 may generate the intensities of the signals received from the wireless LAN APs and the AP lists as the ADD.

Table 2 below exemplarily shows ADD.

TABLE 2

| AP Identification Information (MAC Address) | Intensity of Signal (RSSI) |
|---|---|
| AP(b): 00:63:1a:22:b5:b3 | −70 |
| AP(c): 00:00:1a:22:b3:35 | −75 |
| AP(d): 00:00:1a:22:b3:37 | −80 |
| AP(e): 00:00:1a:22:b3:38 | −85 |

Table 2 above shows a list of APs capable of receiving signals at a current location of the wireless device 1 and intensities of the signals. That is, the list of APs includes an AP(b), an AP(c), an AP(d), and an AP(e), and intensities of the signals of the APs are −70, −75, −80, and −85, respectively.

The ADD collector 40 receives the intensities of signals of the wireless LAN APs and the MAC addresses from the Wi-Fi receiver 30.

If the Wi-Fi receiver 30 receives a request to collect the ADDFD from a user, the Wi-Fi receiver 30 may scan the signals of the wireless LAN APs, receive the scanned signals of the wireless LAN APs, and measure intensities of the received wireless LAN AP signals. The Wi-Fi receiver 30 may identify MAC addresses of the received signals of the wireless LAN APs, and transfer the identified MAC addresses and the measured intensities of the wireless LAN APs to the ADD collector 40.

The ADD collector 40 may generate the ADD including the signal intensities and MAC addresses of the wireless LAN APs, and transfer the generated ADD to the ADD filter 60.

The ADD filter 60 may remove APs included in the AP delete list from the ADD transferred from the ADD collector 40 and store the ADD from which the APs are removed in the local database 45. Meanwhile, according to an embodiment of the present invention, the ADD filter 60 may smooth the signal intensities of the wireless LAN APs, and store a smoothing result in the local database 45, thereby more precisely performing next location estimation. "Smoothing" is a process of applying an AP history detected in the past since a detected AP signal is not always accurate. For example, the ADD filter 60 corrects RSSI signal intensities of AP data detected by the ADD collector 40 by using a past AP history.

For example, a smoothing result of applying a history of an AP 7 with respect to time at a location P (10, 10) is listed in Table 3 below.

TABLE 3

| | Time | | | | | |
|---|---|---|---|---|---|---|
| | t1 | t2 | t3 | t4 | t5 | t6 |
| Signal Intensities (before smoothing) | −70 | −75 | −70 | −90 | −75 | −70 |
| Signal Intensities (after smoothing) | −70 | −75 | −70 | −75 | −75 | −70 |

In accordance with Table 3 above, it is observed that the AP 7 always has the signal intensity of −70 at the location P (10, 10). If a network is unstable or an obstacle occurs, the AP 7 may be observed to have the signal intensity of −90. In this case, the ADD filter 60 may smooth the signal intensity of −90 as an appropriate value by applying a history with respect to time.

The local database 45 may store the ADDFD, the ADD, and/or the RDLE provided from the location estimation server 100.

Although all of the ADDFD, the ADD, and the RDLE are stored in the location database 45 in the present embodiment, this is exemplary, and the ADDFD, the ADD, and the RDLE may be stored in separate databases.

Table 4 below exemplarily shows RDLE.

TABLE 4

| Detection Location | AP Identification Information (MAC Address) | Reliability | Intensity of Signal (RSSI) |
|---|---|---|---|
| . | . | . | . |
| . | . | . | . |
| . | . | . | . |
| P1: (127,37) | AP(a): 00:99:1a:22:b3:35 | 84% | −80 |
|  | AP(b): 00:63:1a:22:b5:b3 | 75% | −65 |
|  | AP(c): 00:00:1a:22:b3:35 | 80% | −79 |
| P2: (127, 38) | AP(b): 00:63:1a:22:b5:b3 | 70% | −75 |
|  | AP(c): 00:00:1a:22:b3:35 | 83% | −85 |
| P3: (127,39) | AP(b): 00:63:1a:22:b5:b3 | 72% | −70 |
|  | AP(c): 00:00:1a:22:b3:35 | 73% | −75 |
|  | AP(d): 00:00:1a:22:b3:37 | 84% | −80 |
|  | AP(e): 00:00:1a:22:b3:38 | 86% | −85 |
| P4: (127,40) | AP(c): 00:00:1a:22:b3:35 | 70% | −65 |
|  | AP(d): 00:00:1a:22:b3:37 | 71% | −70 |
|  | AP(e): 00:00:1a:22:b3:38 | 84% | −80 |
|  | AP(f): 00:00:1a:22:b3:39 | 76% | −75 |
| P5: (127,41) | AP(d): 00:00:1a:22:b3:37 | 77% | −75 |
|  | AP(e): 00:00:1a:22:b3:38 | 80% | −80 |
|  | AP(f): 00:00:1a:22:b3:39 | 74% | −75 |
|  | AP(g): 00:00:1a:22:b3:40 | 69% | −70 |
| P6: (127,42) | AP(e): 00:00:1a:22:b3:38 | 76% | −80 |
|  | AP(f): 00:00:1a:22:b3:39 | 83% | −85 |
|  | AP(g): 00:00:1a:22:b3:40 | 68% | −70 |
| . | . | . | . |
| . | . | . | . |
| . | . | . | . |

In accordance with Table 4 above, the RDLE includes locations, AP lists, intensities of signals of APs included in the AP lists, and reliability.

As an example of the RDLE, P2 has a location (127, 38) and an AP list including AP(b) and AP(c) that have signal intensities of −75 and −85 and reliabilities of 70% and 83%, respectively. As another example of the RDLE, P4 has a location (127, 40) and an AP list including AP(c), AP(d), AP(e), and AP(f) that have signal intensities of −65, −70, −80, and −75 and reliabilities of 70%, 71%, 84%, and 76%, respectively.

"Subsets of RDLE (SRDLE)" is a term indicating each of the RDLE of P1, P2, . . . , P6.

Table 4 above expressly shows the total number of six SRDLE. Table 5 below exemplarily shows one SRDLE.

TABLE 5

| P1: (127,37) | AP(a): 00:99:1a:22:b3:35 | 90% | −80 |
|---|---|---|---|
|  | AP(b): 00:63:1a:22:b5:b3 | 75% | −65 |
|  | AP(c): 00:00:1a:22:b3:35 | 80% | −79 |

The reliability included in the RDLE reflects accuracy of data. An AP list having high reliability is used to more precisely perform location estimation.

The device data synchronization processor 50 may compare a version of the RDLE stored in the location estimation server 100 with a version of the RDLE stored in the local database 45 and synchronize both the RDLE. According to an embodiment of the present invention, the device data synchronization processor 50 may update a segment by requesting the location estimation server 100 to synchronize the RDLE at an initial operation.

According to an embodiment of the present invention, the device data synchronization processor 50 may include an ADD up-loader 51, a RDLE downloader 53, and a version checker 55.

The ADD up-loader 51 may upload the ADDFD stored in the local database 45 and the ADD to the location estimation server 100. An uploading time is determined according to a previously set option. For example, if the ADD is completely collected, the ADD up-loader 51 may simultaneously upload the ADD stored in the local database 45 to the location estimation server 100, or, according to a user's request, may upload the ADD to the location estimation server 100.

The RDLE downloader 53 downloads the RDLE from the location estimation server 100.

According to an embodiment of the present invention, the RDLE downloader 53 may download the RDLE wholly or only the RDLE belonging to a predetermined segment.

The version checker 55 may determine whether a version of the RDLE stored in the location estimation server 100 is the latest compared to a version of the RDLE stored in the local database 45. If the version checker 55 requests a version management unit 145 of the location estimation server 100 for the version of the RDLE, the version management unit 145 may provide the version of the RDLE stored in a server database 120.

Meanwhile, if the RDLE stored in the location estimation server 100 and the local database 45 is divided into segments, the version checker 55 may request the version management unit 145 for lists of the segments and version information of the segments. The version management unit 145 may provide the version checker 55 with the lists of the segments and the version information of the segments stored in the server database 120.

The version checker 55 may compare the list of segments and version information of the segments of the RDLE provided by the location estimation server 100 with the list of segments and the version information of the segments of the RDLE stored in the local database 45. Thereafter, the version checker 55 may determine a segment list to be updated and provide the RDLE downloader 53 with the segment list to be updated.

The RDLE downloader 53 may request the location estimation server 100 for the RDLE included in the segment list to be updated and update the RDLE previously stored in the local database 45 to the RDLE transmitted from the location estimation server 100.

As described above, the latest version of the RDLE may be updated in the local database 45 of the wireless device 1, thereby precisely estimating the location of the wireless device 1 even when communication between the wireless device 1 and the location estimation server 100 is discontinued. Further, the RDLE for each segment may be updated, which prevents overload on operations of the wireless device 1 and the location estimation server 100.

The device location estimation engine 20 may estimate the location of the wireless device 1 by comparing the ADD with the RDLE stored in the local database 45.

As will be described later, the location of the wireless device 1 estimated by the device location estimation engine 20 may be utilized as the ADDFD. For example, the device location estimation engine 20 may compare the ADD with the RDLLE, estimate the location of the wireless device 1, and transfer the estimated location to a location based application, while transferring the estimated location to the ADD collector 40. In this regard, the ADD collector 40 may construct the ADDFD by using the location transferred from the device location estimation engine 20 and the ADD. To secure accuracy of data, the ADD filter 60 may filter the location estimated by the device location estimation engine 20. The filtered location is included in the ADDFD.

As described above, in the present embodiment, the location of the wireless device 1 is estimated, and simultaneously, the RDLE including the estimated location is constructed, which need no separately continuous scanning operation.

According to an embodiment of the present invention, estimating of the location of the wireless device 1 may be performed by the wireless device 1 or the location estimation server 100. If the wireless device 1 estimates the location thereof, the device location estimation engine 20 may estimate the location of the wireless device 1 by using the RDLE stored in the local database 45.

To this end, the device location estimation engine 20 may include a location determination subject determining unit 21, a location estimation engine unit 23, and a location estimation requesting unit 25.

The location determination subject determining unit 21 may determine whether the location of the wireless device 1 is determined by the wireless device 1 or the location estimation server 100 according to a previously set condition.

The previously set condition may be determined by the user or a designer of the wireless device 1. The user or designer may set one of the wireless device 1 and the location estimation server 100 as a location determination subject that estimates the location of the wireless device 1.

According to an embodiment of the present invention, if the wireless device 1 is able to communicate with the location estimation server 100, the location estimation server 100 may determine the location of the wireless device 1, and, if the wireless device 1 is unable to communicate with the location estimation server 100, the wireless device 1 may determine the location thereof.

In addition, various conditions may be set by the user or the designer. The location determination subject determining unit 21 may determine the location determination subject in real time according to the set conditions.

If the location determination subject determining unit 21 determines that the wireless device 1 estimates the location thereof, the location estimation engine unit 23 may estimate the location of the wireless device 1 by using the RDLE stored in the local database 45.

The location estimation engine unit 23 of the wireless device 1 may estimate the location of the wireless device 1 by comparing the ADD collected by the ADD collector 40 (or the ADD filtered by the ADD filter 60) with the RDLE stored in the local database 45 and selecting the RDLE satisfying a predetermined standard.

In this regard, the location estimation engine unit 23 may apply the predetermined standard when comparing the AP signals included in the ADD with the RDLE and estimating the location of the wireless device 1.

The predetermined standard may be set in various ways as presented below.

First, identities of 100% between AP lists and between AP intensities;

Second, an identity of 100% between AP lists and a difference of ±0.05% or less between AP intensities;

Third, an identity of 95% between AP lists and a difference of ±0.05% or less between AP intensities;

Fourth, an identity between AP lists having reliabilities of 80% or higher and a difference of ±0.05% or less between AP intensities; and Fifth, an identity between AP lists having reliabilities of 85% or higher and a difference of ±0.05% or less between AP intensities.

The above standards are exemplary, and thus the present invention is not limited thereto, and other standards may be set.

For example, the location estimation standard is assumed that the ADD is the data shown in Table 2, the RDLE is the data shown in Table 4, and lists of APs having reliabilities of 70% or higher are completely identical to each other. In this case, the location estimation engine unit 23 may estimate the location of the wireless device 1 as P3.

Meanwhile, in the present embodiment, the RDLE may be divided into segments as shown in Table 6. A detailed description of a segment will be described later. A method of determining the location of the wireless device 1 will now be described on the assumption that the RDLE is divided into segments.

The location estimation engine unit 23 of the present embodiment may compare an AP list for each segment of the RDLE stored in the local database 45 with an AP list of the ADD and select segments in which the AP lists are the same or the same segments more than a predetermined number so as to estimate the location of the wireless device 1. The location estimation engine unit 23 may compare the RDLE included in the selected segments, i.e., the SRDLE, with the ADD. As a comparison result, the SRDLE in which AP lists and signal intensities are the same or the SRDLE satisfying a predetermined standard may be selected. The location estimation engine unit 23 may estimate a location included in the selected SRDLE as the location of the wireless device 1. In this regard, the predetermined standard, for example, may be set that 90% or higher of the number of APs is the same, and signal intensities have an error range of ±10% or less. Such a predetermined standard can be appropriately selected by one who invents the present invention.

According to another embodiment of the present invention, the location estimation engine unit 23 may select APs having reliabilities higher than a predetermined standard value from among the AP list for each segment of the RDLE as objects of comparison. For example, APs having reliabilities of 80% or higher may be compared to each other. Thereafter, the location estimation engine unit 23 may compare the RDLE included in the selected segments, i.e, the SRDLE, with the ADD, and select the SRDLE in which AP lists and signal intensities are the same or the SRDLE satisfying a predetermined standard. Finally, the location estimation engine unit 23 may estimate a "location included in the selected SRDLE" as the location of the wireless device 1.

If the location determination subject determined by the location determination subject determining unit 21 is the location estimation server 100, the location estimation requesting unit 25 may request the location estimation server 100 to estimate the location of the wireless device 1.

Meanwhile, the wireless device 1 may further include a location display application for displaying the location of the wireless device 1. The location display application may display a map on the user interface 10 of the wireless device 1, and display the location of the wireless device 1 estimated by the location estimation engine unit 23 of the wireless device 1 or the location estimation server 100 on the map.

The location estimation server 100 may construct and store the RDLE used to estimate the location of the wireless device 1 as the server database 120, compare the RDLE stored in the constructed server database 120 with the ADD provided by the wireless device 1, and estimate the location of the wireless device 1.

The location estimation server 100 of the present embodiment may include a location data construction engine 130, a server database 120, a server location estimation engine 110, a server data synchronization processor 140, and a RDLE reliability calculation engine 150.

The location data construction engine 130 may generate the RDLE by using the ADDFD generated by the wireless device 1.

The RDLE reliability calculation engine (hereinafter referred to as the "reliability calculation engine") 150 may calculate reliability of each of the ADDFD. The location data construction engine 130 may remove data having reliability lower than a previously set reference value from the ADDFD and generate only the ADDFD satisfying the reliability as the RDLE.

As described above, the RDLE of the present embodiment may include reliability that may correspond to each AP.

To this end, the location data construction engine 130 of the present embodiment may generate statistical data from the ADDFD transferred from the wireless device 1. In this regard, the statistical data is data generated to calculate the reliability in the reliability calculation engine 150 that will be described later.

The reliability calculation engine 150 may calculate reliability of each of the ADD from the statistical data. Thereafter, the location data construction engine 130 may store the statistical data, from which data having reliability lower than the previously set reference value is removed, as the RDLE.

The server database 120 may store the RDLE generated by the location data construction engine 130. Meanwhile, the server database 120 may store the ADD provided from the wireless device 1 in real time. The ADD may be stored in a separate database (not shown).

According to an embodiment of the present invention, the RDLE stored in the server database 120 i) may be allocated to each segment, ii) may not be allocated to each segment and may be wholly stored, or iii) may be allocated to each segment and simultaneously may not be allocated to each segment.

The server location estimation engine 110 may estimate the location of the wireless device 1 by comparing the ADD provided from the wireless device 1 in real time with the RDLE stored in the server database 120.

The server data synchronization processor 140 may receive the ADD from the wireless device 1. The server data synchronization processor 140 may transfer the RDLE to the wireless device 1.

The reliability calculation engine 150 may calculate the reliability of each of the ADDFD. Elements used to determine the reliability may include intensities of RSSI signals, the number of users, detection time, a distribution of a corresponding AP, etc. In addition to the elements, other appropriate elements may be used to calculate the reliability.

The above elements will now be sequentially described in detail below.

Location Data Construction Engine 130

The location data construction engine 130 may include an update confirming unit 131, a data construction engine unit 133, and a segment partitioning unit 135.

The update confirming unit 131 may continuously examine whether the server database 120 is updated and confirms whether the most recently updated ADDFD is stored in the server database 120.

If the update confirming unit 131 confirms that new ADDFD is stored in the server database 120, the data construction engine unit 133 may perform a "prior arrangement" operation, such as an error correction operation. The prior arrangement of the ADD is for removing an error input value, etc.

The data construction engine unit 133 may also generate statistical data from the new ADDFD. Thereafter, if the reliability calculation engine 150 calculates the reliability from the statistical data, the data construction engine unit 133 may newly include the statistical data, from which data having reliability lower than a previously set reference value is removed from the statistical data, in the RDLE in which only the statistical data satisfying the reliability is previously stored.

According to an embodiment of the present invention, the data construction engine unit 133 may separately manage a delete list of APs having very low reliability that are determined to be deleted when the reliability is calculated. If the wireless device 1 requests the location estimation server 100 for the delete list of APs, the location estimation server 100 may transfer the delete list of APs to the wireless device 1.

According to an embodiment of the present invention, the data construction engine unit 133 may allocate the RDLE to any one of segments that are previously divided regions.

When the RDLE is newly updated, methods of allocating the newly updated RDLE to segments in the data construction engine unit 133 will now be exemplarily described.

A first method is to allocate the segments by using data including the AP lists and AP signal intensities that are included in the newly updated RDLE. More specifically, the AP lists and AP signal intensities that are included in the newly updated RDLE may be compared to the RDLE stored in the server database 120, the segments having the AP lists satisfying a predetermined standard may be selected, and the newly updated RDLE may be allocated to the selected segments.

A second method is to allocate the segments by using the location of the wireless device 1 included in the newly updated RDLE. For example, the newly updated RDLE may be allocated to the segments including the location.

If the number of the RDLE included in the segments exceeds a previously set threshold m, the segment partitioning unit 135 may divide a corresponding segment by using a previously set method.

For example, each segment may be divided into rectangles. When the newly updated RDLE is allocated to the segments, if the number of the RDLE included in the segments exceeds the previously set threshold m, the segment partitioning unit 135 may divide a corresponding segment by a previously set segment division number n again.

Figure 4:
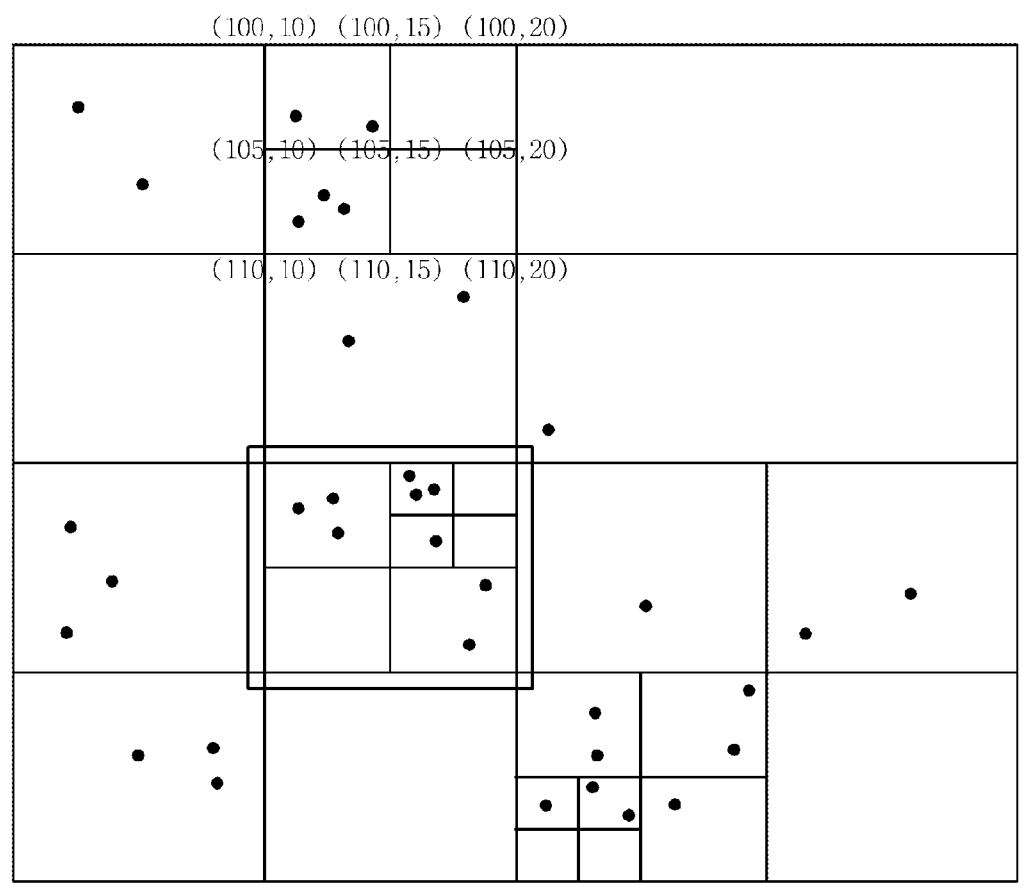
FIG. 4 is a schematic diagram of a structure of a segment.

As indicated in an upper region of FIG. 4, a rectangular segment is defined as a pair of latitude and longitude (100,10) through (110,20). If the ADDFD is continuously added to the rectangular segment, and the number of the ADDFD exceeds the previously set threshold m, the segment partitioning unit 135 may divide a corresponding segment into n. If the corresponding segment is divided into 4, a region (100,10) through (100,20) is divided into four segments that are four regions of (100,10)~(105,15), (105,10)~(110,15), (100,15)~(105,20), and (105,15)~(110,20). The ADDFD included in the segment (i.e. the rectangular segment defined as the pair of latitude and longitude (100,10) through (110,20)) before divided into four segments will be allocated to each of the four segments again.

According to an embodiment of the present invention, as soon as the ADDFD is generated, the data construction engine unit 133 of the location data construction engine 130 may allocate the generated ADDFD to each segment including a corresponding detection location. If the number of the ADDFD allocated to the segments exceeds the previously set threshold m, a corresponding segment is divided into n. The ADDFD included in the segment before divided into n is allocated to the newly n divided segments according to detection locations. A repetition of such an operation may result in a segment model shown in FIG. 4.

Table 6 below exemplarily shows RDLE to which segments are allocated.

TABLE 6

| | Detection Location | AP Identification Information (MAC Address) | Reliability | Intensity of Signal (RSSI) |
|---|---|---|---|---|
| . | . | . | | . |
| . | . | . | | . |
| . | . | . | | . |
| SEG2 | P1: (127,37) | AP(a): 00:99:1a:22:b3:35 | 84% | −80 |
| | | AP(b): 00:63:1a:22:b5:b3 | 75% | −65 |
| | | AP(c): 00:00:1a:22:b3:35 | 80% | −79 |
| | P2: (127. 38) | AP(b): 00:63:1a:22:b5:b3 | 70% | −75 |
| | | AP(c): 00:00:1a:22:b3:35 | 83% | −85 |
| | P3: (127,39) | AP(b): 00:63:1a:22:b5:b3 | 72% | −70 |
| | | AP(c): 00:00:1a:22:b3:35 | 73% | −75 |
| | | AP(d): 00:00:1a:22:b3:37 | 84% | −80 |
| | | AP(e): 00:00:1a:22:b3:38 | 86% | −85 |
| | P4: (127,40) | AP(c): 00:00:1a:22:b3:35 | 70% | −65 |
| | | AP(d): 00:00:1a:22:b3:37 | 71% | −70 |
| | | AP(e): 00:00:1a:22:b3:38 | 84% | −80 |
| | | AP(f): 00:00:1a:22:b3:39 | 76% | −75 |
| SEG3 | P5: (127,41) | AP(d): 00:00:1a:22:b3:37 | 77% | −75 |
| | | AP(e): 00:00:1a:22:b3:38 | 80% | −80 |
| | | AP(f): 00:00:1a:22:b3:39 | 74% | −75 |
| | | AP(g): 00:00:1a:22:b3:40 | 69% | −70 |
| SEG4 | P6: (127,42) | AP(e): 00:00:1a:22:b3:38 | 76% | −80 |
| | | AP(f): 00:00:1a:22:b3:39 | 83% | −85 |
| | | AP(g): 00:00:1a:22:b3:40 | 68% | −70 |
| | P7: (127,43) | AP(g): 00:00:1a:22:b3:40 | 84% | −85 |
| . | . | . | . | . |
| . | . | . | . | . |
| . | . | . | . | . |

In accordance with Table 6 above, the previously set threshold m is 4, and four or less SRDLE is included in a single segment. For example, a segment SEG2 includes four SRDLE, and a segment SEG3 includes one SRDLE.

Meanwhile, although Table 6 includes reliability, this is exemplary, and thus the reliability may not be included in Table 6. That is, if the ADD filter 60 is not employed in the present embodiment, the RDLE may not include the reliability.

In the present specification, a "segment AP list" includes, for example, an AP list of the segment SEG2 including AP(a), AP(b), AP(c), AP(d), A(e), and AP(f), and an AP list of the segment SEG3 including AP(d), AP(e), AP(f), and AP(g).

Referring to FIG. 4, a threshold of the RDLE in which segments are divided is 3, and the segments are divided into 4. The threshold may be set to be greater than 3 when actually embodied.

Each point of FIG. 4 indicates a location of the RDLE. The number of the RDLE allocated to each segment does not exceed the threshold of 3. The more and the smaller the segments are divided, the more the RDLE is crowded. The less and the greater the segments are divided, the less the RDLE is rare.

Diving of the RDLE into segments and managing the RDLE in segment units have the following advantages:

1) When RDLE is newly added, only segments to which the newly added

RDLE is added are used to construct new RDLE, thereby reducing generation of unnecessary RDLE and facilitating construction of data;

2) When the RDLE is provided to the wireless device 1, the RDLE can be transmitted in segment units, thereby reducing an amount of communication between the wireless device 1 and the location estimation server 100, and preventing an unnecessarily excessive storage space from being occupied; and 3) When the device location estimation engine 20 or the server location estimation engine 110 searches for the RDLE in coincidence with the ADD, a definite number of segments and the RDLE included in a corresponding segment are searched for, thereby maintaining a definite level of system performance.

Server Database 120

The server database 120 may store the RDLE generated by the location data construction engine 130 and the ADD provided from the wireless device 1 in real time. The RDLE of the present embodiment may include AP lists (MAC addresses), AP signal intensities, reliability, location information, and segment information.

Server Location Estimation Engine 110

The server location estimation engine 110 may estimate a current location of the wireless device 1 by comparing the ADD transmitted from the wireless device 1 with the RDLE stored in the server database 120. To this end, the server location estimation engine 110 may include a segment determining unit 113 and a location estimation engine unit 115.

The segment determining unit 113 may select segments including APs satisfying a predetermined standard by comparing a list of APs included in the ADD with a list of APs of each segment stored in the server database 120.

The location estimation engine unit 115 compares the RDLE included in the selected segments with the ADD transferred from the wireless device 1, thereby reducing search time and increasing accuracy of a search result.

The location estimation engine unit 115 may withdraw the RDLE included in the segments selected by the segment determining unit 113. The location estimation engine unit 115 may compare the AP lists and signal intensities of the withdrawn RDLE with the AP lists and signal intensities of the ADD received from the wireless device 1. If a comparison result satisfies a predetermined standard, the location estimation engine unit 115 may determine a location of the RDLE satisfying the predetermined standard as the current location of the wireless device 1. The location estimation engine unit 115 may use a location estimation algorithm, for example, a probability based Bayesian algorithm or a k-NNSS algorithm using differences between signal intensities.

The location estimation engine unit 115 may correct the signal intensities of the APs included in the ADD. A conventionally widely known means or method is used to correct the signal intensities and can be easily selected and applied by one of ordinary skill in the art, and thus a detailed description thereof will be omitted here.

The location estimation engine unit 115 may also correct the location of the wireless device 1 by using a previously selected filter algorithm. The location estimation engine unit 115 may use a location correction filter algorithm such as a Kalman filter, a speed filter, etc. However, the present invention is not limited thereto.

Server Data Synchronization Processor 140

The server data synchronization processor 140 of the present embodiment may include an ADD receiver 141, a RDLE transmitter 143, and a version managing unit 145.

The ADD receiver 141 may receive the ADDFD transmitted from the wireless device 1 and store the ADDFD in the server database 120. Further, the ADD receiver 141 may receive the ADD transmitted from the wireless device 1 and store the ADDFD in the server database 120.

The version managing unit 145 may manage version information of the RDLE and, if the wireless device 1 requests the version managing unit 145 for the version information of the RDLE, provide the wireless device 1 with the version information of the RDLE.

According to an embodiment of the present invention, if the version checker 55 of the wireless device 1 requests the version managing unit 145 for a list of segments of the RDLE and version information of the segments, the version managing unit 145 of the present embodiment may provide the wireless device 1 with the list of segments of the RDLE and the version information of the segments.

The RDLE transmitter 143 may transmit the location information of the wireless device 1 determined by the server location estimation engine 110 to the wireless device 1. Further, the RDLE transmitter 143 may transmit the RDLE to the wireless device 1.

The RDLE transmitter 143 of the present embodiment may transmit the RDLE included in the segments selected by the version checker 55 to the wireless device 1.

The segments selected by the version checker 55 are required to be updated. The version checker 55 selects the segments required to be downloaded and requests the location estimation server 100, thereby reducing an amount of communication between the wireless device 1 and the location estimation server 100, and preventing overloading on the wireless device 1 or redundant data from being stored.

RDLE Reliability Calculation Engine 150

The RDLE reliability calculation engine 150 of the present embodiment may include a RSSI signal intensity calculating unit 151, a user number calculating unit 153, a detection time calculating unit 155, an AP distribution range calculating unit 157, and a collection mode calculating unit 159. These elements are used to calculate reliability. The RDLE reliability calculation engine 150 may further include other elements for calculation of the reliability.

The reliability calculation engine 150 may calculate the reliability according to a predetermined standard by allocating weights to an RSSI signal, a user number, detection time, an AP distribution range, and/or a collection mode, etc. According to an embodiment of the present invention, the reliability can be calculated by summing reliabilities calculated by the RSSI signal intensity calculating unit 151, the user number calculating unit 153, the detection time calculating unit 155, the AP distribution range calculating unit 157, and the collection mode calculating unit 159 according to Equation 1 below, $$\text{Reliability} = (\text{value calculated based on the RSSI signal intensity}) \times a + (\text{value calculated based on the user number}) \times b + (\text{value calculated based on the detection time}) \times c + (\text{value calculated based on the AP distribution range}) \times d + (\text{value calculated based on the collection mode}) \times e \quad [\text{Equation 1}]$$

wherein, a, b, c, d, and e denote previously determined weights.

Equation 1 above is exemplary, and the reliability may be calculated according to various equations by using other conditions.

The RSSI signal intensity calculating unit 151 may calculate a high value in accordance with a strong signal intensity of a detected AP. If the detected AP is detected by many persons in a place, since there is a high possibility that the detected AP is sure to be in the place, the user number calculating unit 153 may calculate a value higher than a value when the detected AP is not sure to be in the place. The detection time calculating unit 155 may determine how recently data was detected and calculate a value higher than a value calculated from data detected a long time ago.

If the detected AP is already included in a database, the AP distribution range calculating unit 157 may inspect a distribution of locations where a corresponding AP is detected. Thus, if a distribution of locations of the detected AP is greater than a distance covered by the RSSI signal intensity of a general AP, the AP distribution range calculating unit 157 may regard the detected AP as indefinite data and calculate a low value of the detected AP. To the contrary, if the distribution of locations of the detected AP is within the distance covered by the RSSI signal intensity of a general AP, the AP distribution range calculating unit 157 may regard the detected AP as highly accurate data and calculate a high value of the detected AP.

As such, identifying of accurate APs and inaccurate APs through a distribution of APs is one of the most influencing reliability factors. As an experiment example, when reliability is calculated by applying a distribution range of APs, and a location is estimated by using data extracted from the calculated reliability, an accuracy of the location estimation can be maintained to be similar while a size of the RDLE is reduced by about 45%. This means that the reliability based on the distribution range of APs can be used to reduce a size of data and is used to increase the accuracy of the location estimation as well.

The collection mode calculating unit 159 may change the reliability according to what method is used to obtain a location where the user detects AP data or who collects the AP data. As described above, there are, for example, three methods of calculating a detection location in the wireless device 1.

More specifically, the three methods include a method of estimating a location of the wireless device 1 in the wireless device 1 by using a GPS, a method of estimating the location of the wireless device 1 in the wireless device 1 by using the location estimation algorithm of the present embodiment, and a method of using a current location of the wireless device 1 directly input by the user. Each of the three methods may reflect the reliability in order that the location of the wireless device 1 is estimated through the GPS, the location of the wireless device 1 is estimated using the location estimation algorithm, and a user's input is received.

According to an embodiment of the present invention, when the location of the wireless device 1 is estimated through the GPS, the highest reliability is reflected, and when the user manually inputs the current location of the wireless device 1, the lowest reliability is reflected. In addition, the reliability may be differently reflected according to who uses the wireless device 1 that collects data. For example, reliability of data collected by an operator may be higher, and reliability of data collected by the user may be lower than that of the operator.

Therefore, the collection mode calculating unit 159 of the present embodiment calculates a high value having high reliability based on the two pieces of information regarding a detection location input method and a person who collects data. For example, the collection mode calculating unit 159 calculates the highest value when the operator detects the location through the GPS, and calculates the lowest value when the user manually inputs the location.

According to an experiment result of the present embodiment, the collection modes (collection subjects+collection methods) are arranged in high reliability order of "(operator+GPS)>(operation+location estimation)>(operator+manual)>(user +GPS)>(user+location estimation)>(user+manual)". Better combinations are prioritized according to the experiment result, and thus weights may vary.

If reliability of each piece of data is calculated through the series of operations, data having reliability lower than a reference value is removed, and data having reliability that satisfies the reference value may be stored as the RDLE. Each of the RDLE is allocated to an segment. Thereafter, the RDLE may be transmitted in segment units according to a request of the wireless device 1 or a previously set period.

Figure 5:
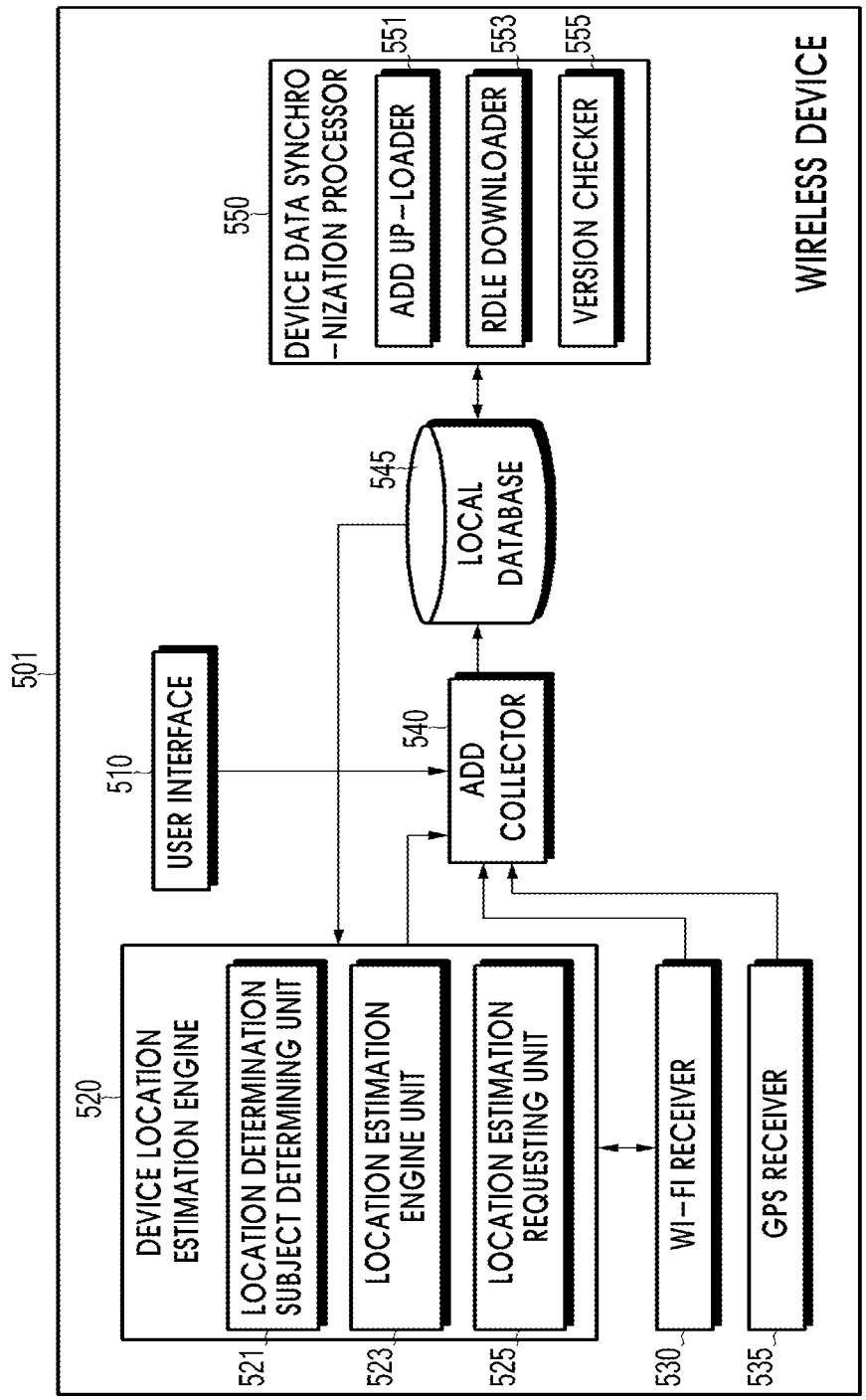
FIG. 5 is a block diagram of a wireless device according to another embodiment of the present invention.
Figure 6:
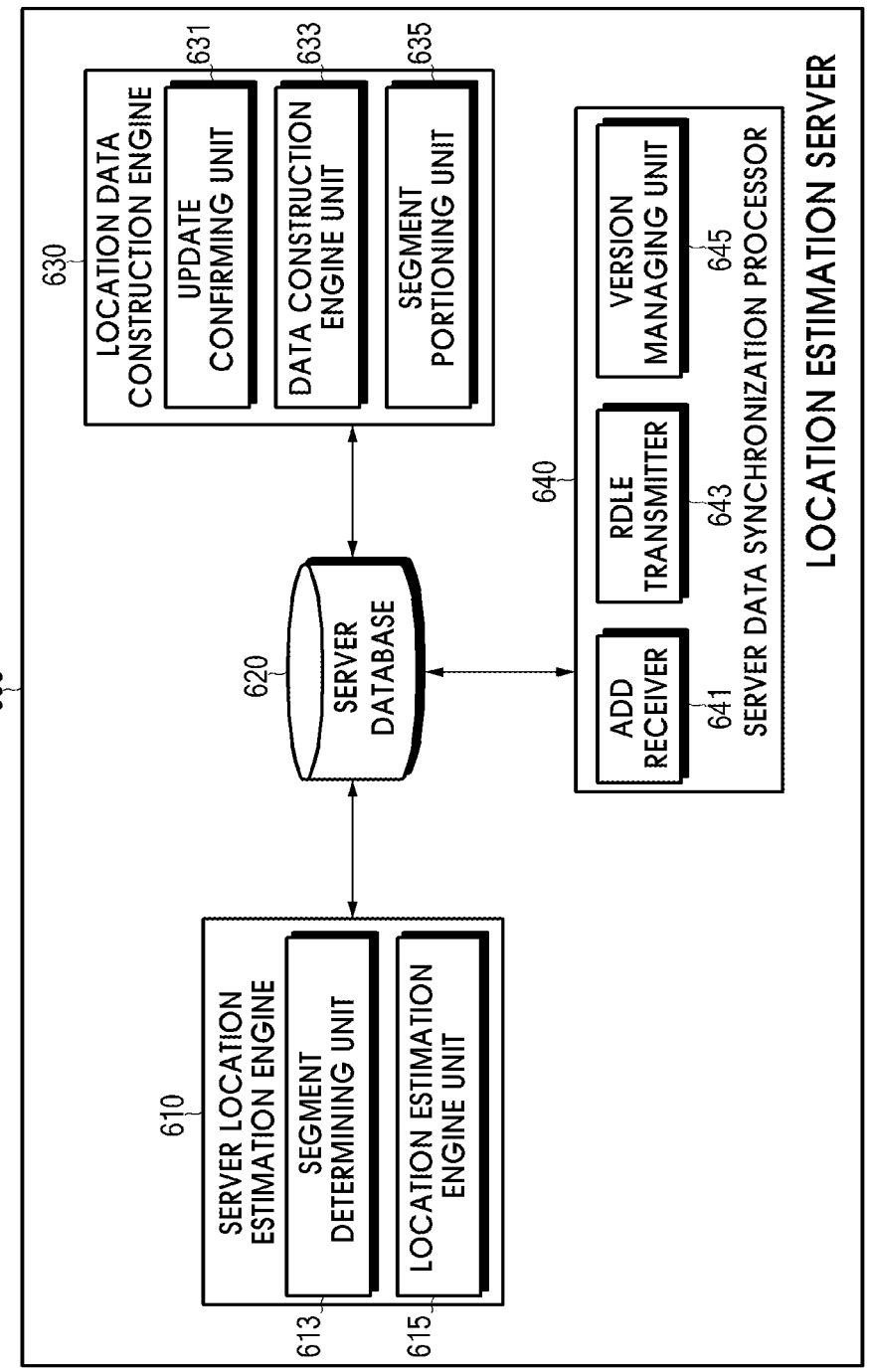
FIG. 6 is a block diagram of a location estimation server according to another embodiment of the present invention.

FIG. 5 is a block diagram of a wireless device 501 according to another embodiment of the present invention. FIG. 6 is a block diagram of a location estimation server 600 according to another embodiment of the present invention. Referring to FIGS. 1, 5, and 6, the real time location tracking system of the wireless device 501 using the wireless LAN AP includes the wireless device 501 that collects ADDFD or ADD, and the location estimation server 600 that constructs a database by using the ADDFD collected by the wireless device 501 and estimates a location of the wireless device 501 by using the constructed database.

The wireless device 501 of FIG. 5 includes an ADD collector 540, a local database 545, a device location estimation engine 520, a device data synchronization processor 550, a user interface 510, a GPS receiver 535, and a Wi-Fi receiver 530. The location estimation server 600 of FIG. 6 may store RDLE used to estimate the location of the wireless device 501, compare the RDLE with the ADD provided by the wireless device 501, and determine the location of the wireless device 1. Still referring to FIG. 6, the location estimation server 600 may include a location data construction engine 630, a server database 620, a server location estimation engine 610, and a server data synchronization processor 640.

In comparison of the wireless device 1 of FIG. 2 and the wireless device 501 of FIG. 5, the wireless device 1 of FIG. 2 that further includes the ADD filter 60 is different from the wireless device 501 of FIG. 5. That is, the wireless device 501 of FIG. 5 directly stores the data collected by the ADD collector 40 of FIG. 2 in the local database 545 since the ADD filter 60 of FIG. 2 is not included in the wireless device 501 of FIG. 5. The other elements of FIG. 5 are the same as or are quite similar to the elements of FIG. 2 indicating similar reference numerals in terms of functions, and thus detailed descriptions thereof will not be repeated here.

In comparison of the location estimation server 100 of FIG. 3 and the location estimation server 600 of FIG. 6, the location estimation server 100 of FIG. 3 which further includes the RDLE reliability calculation engine 150 is different from the location estimation server 600 of FIG. 6. That is, the location estimation server 600 of FIG. 6 does not calculate reliability of the RDLE. The other elements of FIG. 6 are the same as or are quite similar to the elements of FIG. 3 indicating similar reference numerals in terms of functions, and thus detailed descriptions thereof will not be repeated here.

Figure 7A:
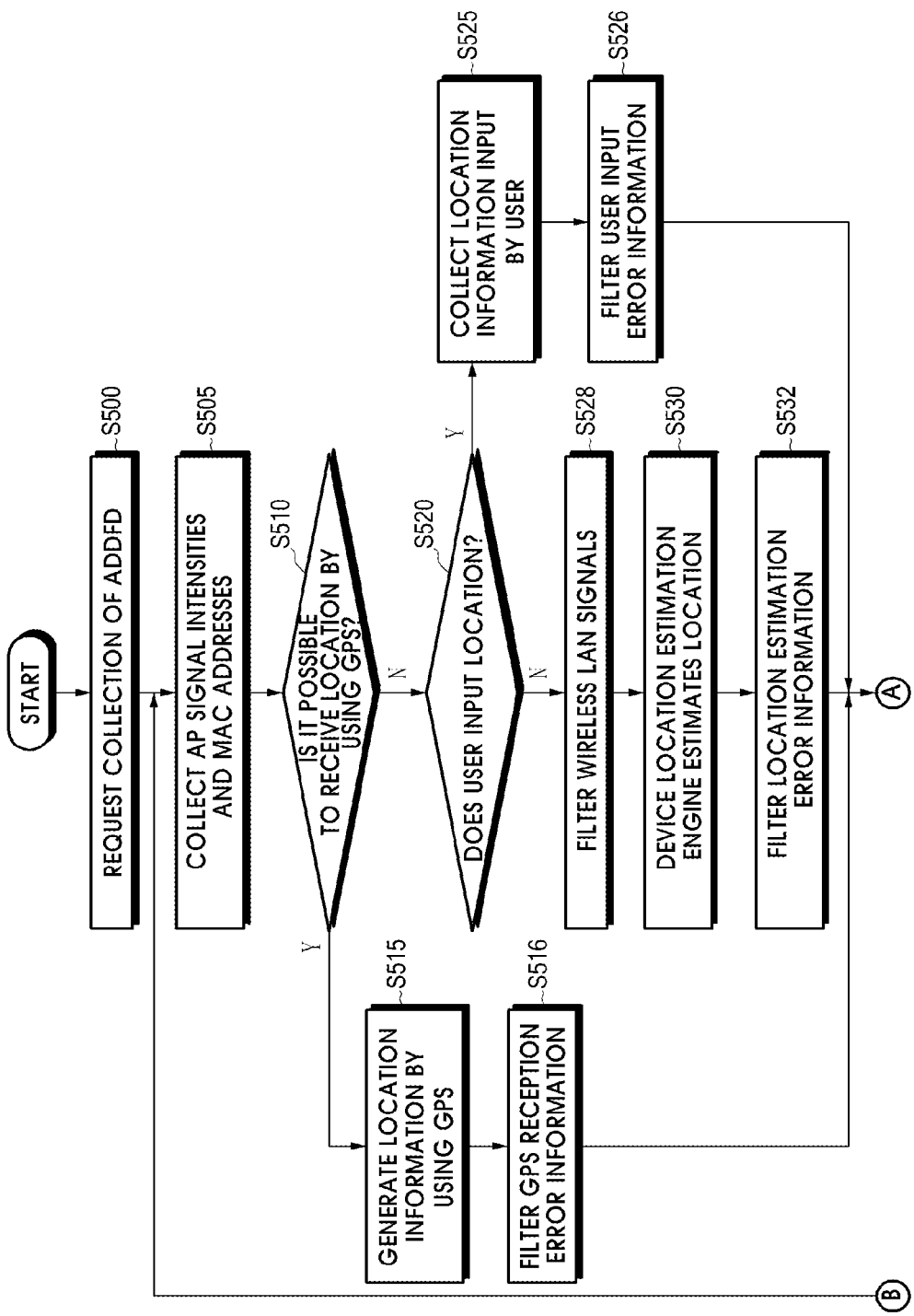
FIGS. 7A and 7B are flowcharts of a process of collecting access point (AP) detection data for DB construction (ADDFD) in the wireless device of FIG. 1 according to an embodiment of the present invention.
Figure 7B:
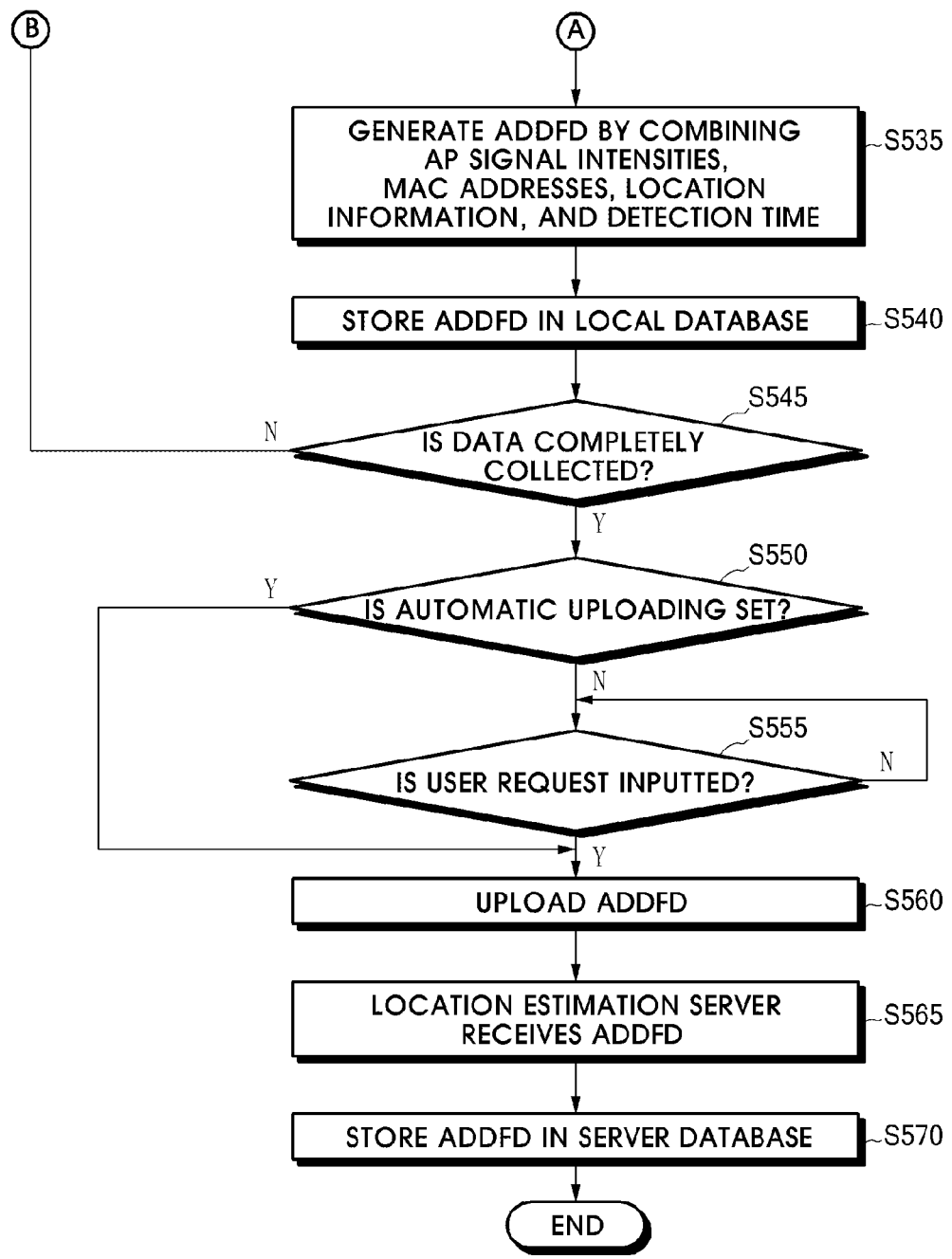

FIGS. 7A and 7B are flowcharts of a process of collecting ADDFD in the wireless device 1 according to an embodiment of the present invention. Referring to FIGS. 7A and 7B, if a user requests a collection of the ADDFD through the user interface 10 (operation S500), the Wi-Fi receiver 30 may scan and receive signals of wireless LAN APs. In this regard, the Wi-Fi receiver 30 may receive intensities of the signals of wireless LAN APs and MAC addresses thereof (operation S505). In this regard, although the Wi-Fi receiver 30 scan the signals of wireless LAN APs according to a user's request, the Wi-Fi receiver 30 can periodically or non-periodically scan the signals of wireless LAN APs irrespective of the user's request.

If the location of the wireless device 1 can be collected through the GPS receiver 35 (operation S510-Y), the ADD collector 40 may obtain information regarding the location of the wireless device 1 through the GPS receiver 35 (operation S515). The GPS reception error information filter 63 may remove indefinite data from the obtained information (operation S516).

If the location of the wireless device 1 cannot be collected through the GPS receiver 35 (operation S510-N), it is confirmed whether a user directly inputs the location of the wireless device 1 through the user interface 10 (operation S520). If the user inputs the location, the ADD collector 40 may obtain the location input by the user as the information regarding the location of the wireless device 1 (operation S525). The user input error information filter 60 may remove indefinite data from the obtained information (operation S526).

Meanwhile, if the location of the wireless device 1 cannot be collected through the GPS receiver 35 and the user does not input the location, the device location estimation engine 20 or the server location estimation engine 110 may collect the location of the wireless device 1. The flowchart of FIGS. 7A and 7B illustrate that the device location estimation engine 20 collects the location of the wireless device 1. A process of collecting the location of the wireless device 1 by using the server location estimation engine 110 may refer to FIGS. 12A and 12B and an explanation thereof.

Still referring to FIGS. 7A and 7B, the ADD filter 60 may remove very weak or indefinite AP signals from the AP signals collected in various ways or smooth the very weak or indefinite AP signals (operation S528). The device location estimation engine 20 may search for RDLE satisfying a predetermined standard by comparing the AP signals filtered by the ADD filter 60 and the MAC addresses with RDLE stored in the local database 45. The device location estimation engine 20 may estimate a location included in the RDLE satisfying the predetermined standard as the location of the wireless device 1 (operation S530).

The location estimation error information filter 65 may perform a filtering operation of removing or smoothing indefinite data with respect to the estimated location (operation S532). The information of the location of the wireless device 1 filtered in operation S532, and the AP signal intensities and MAC addresses collected in operation S505 are generated as the ADDFD (operation S535). The ADDFD is stored in the local database 45 (operation S540). The ADD collector 40 determines whether the ADDFD is completely collected (operation S545). Thereafter, operations S505 through S540 are repeated until the ADDFD is completely collected.

If the ADDFD is completely collected, the ADD up-loader 51 uploads the ADDFD to the location estimation server 100. If uploading is automatically set, the ADD up-loader 51 may upload the ADDFD according to a previously set period (operations S550-Y, S560). If the ADDFD is uploaded according to a user's instruction, the ADD up-loader 51 may upload the ADDFD according to a user's request (operations S555-Y, S560).

The ADD receiver 141 of the location estimation server 100 may receive the ADDFD and store the received ADDFD in the server database 120 (operations S565, S570).

Although the AP signals are filtered in operation S528 in the present embodiment, the AP signals may be filtered and smoothed right after the intensities of the AP signals and the MAC addresses are collected (operation S505). That is, the ADD filter 60 does not perform operation S528 and perform an operation of filtering the AP signals between operations S505 and S510.

Figure 8B:
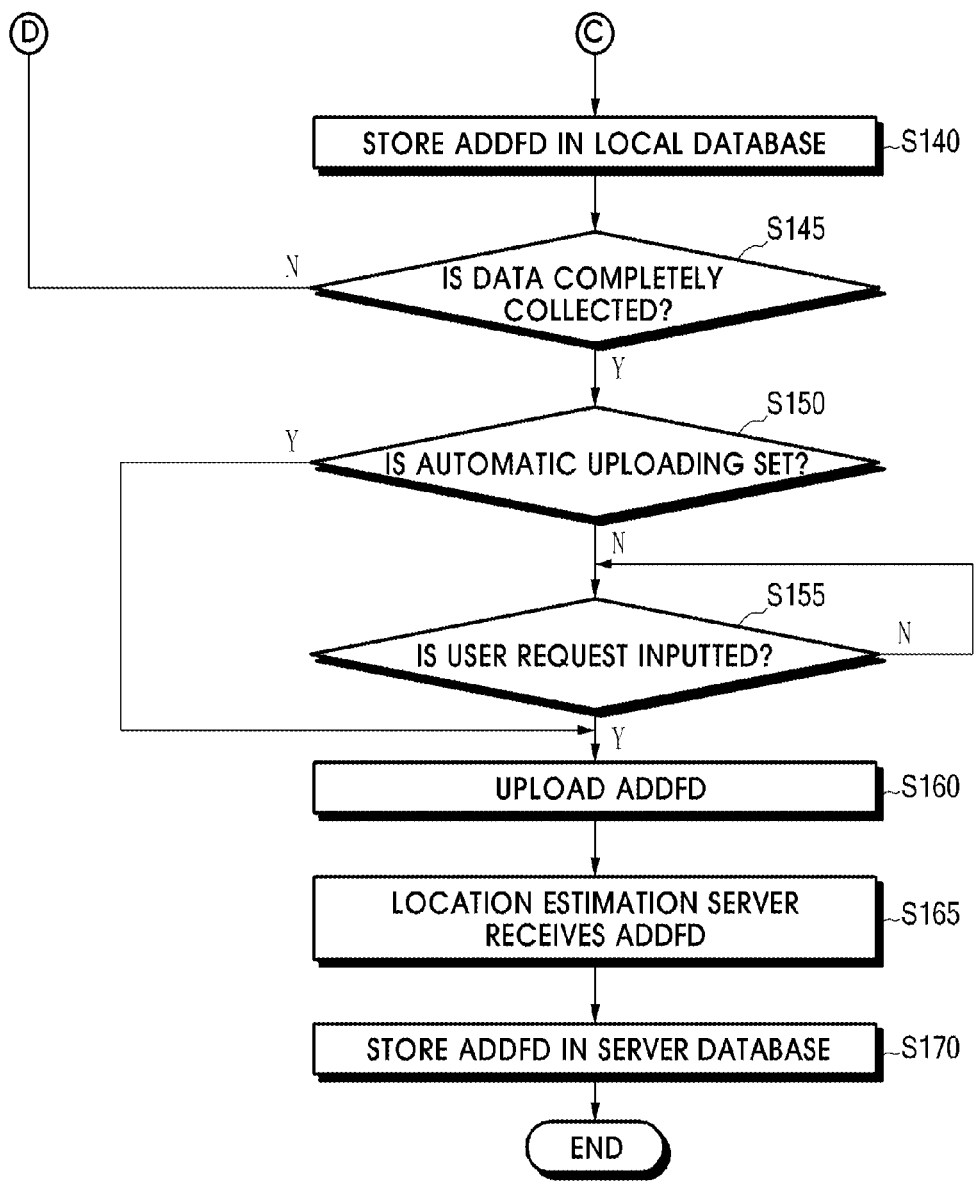

FIGS. 8A and 8B are flowcharts of a process of collecting ADDFD in the wireless device 501 according to an embodiment of the present invention. Referring to FIGS. 8A and 8B, if a request to collect ADDFD is received from a user (operation S100), the Wi-Fi receiver 530 may scan and receive signals of wireless LAN APs. In this regard, the Wi-Fi receiver 530 may receive intensities of the signals of wireless LAN APs and MAC addresses thereof (operation S105). If information regarding a location of the wireless device 501 can be obtained through the GPS receiver 535 (operation S110), the information regarding the location of the wireless device 1 is obtained through the GPS receiver 535 (operation S115). If the information regarding the location of the wireless device 1 cannot be obtained through the GPS receiver 535, it is confirmed whether a user directly inputs the location of the wireless device 1 through the user interface 510 (operation S120). If the user inputs the location, the location input by the user is collected as the information regarding the location of the wireless device 1 (operation S125). If the user does not input the location, the device location estimation engine 520 is used to compare RDLE stored in the local database 545 with the intensities of the signals of wireless LAN APs and the MAC addresses thereof, withdraw matching RDLE, and estimated the location of the wireless device 501 (operation S130).

Meanwhile, the ADD collector 540 may generate ADDFD including the intensities of the signals of wireless LAN APs, the MAC addresses thereof, and the location (operation S135). The ADDFD is stored in the local database 545 (operation S140). It is determined whether the ADDFD is completely collected (operation S145). Operations S105 through S140 are repeated until the ADDFD is completely collected. If the ADDFD is completely collected, the ADD up-loader 551 uploads the ADDFD to the location estimation server 600. If uploading is automatically set, the ADD up-loader 551 may immediately upload the ADDFD (operations S150-Y, S160). If the ADDFD is uploaded according to a user's instruction, the ADD up-loader 551 may upload the ADDFD to the location estimation server 600 after receiving a user's request (operations S155-Y, S160).

The location estimation server 600 may receive the ADDFD through the ADD receiver 641 and store the received ADDFD in the server database 620 (operations S165, S170).

Figure 9:
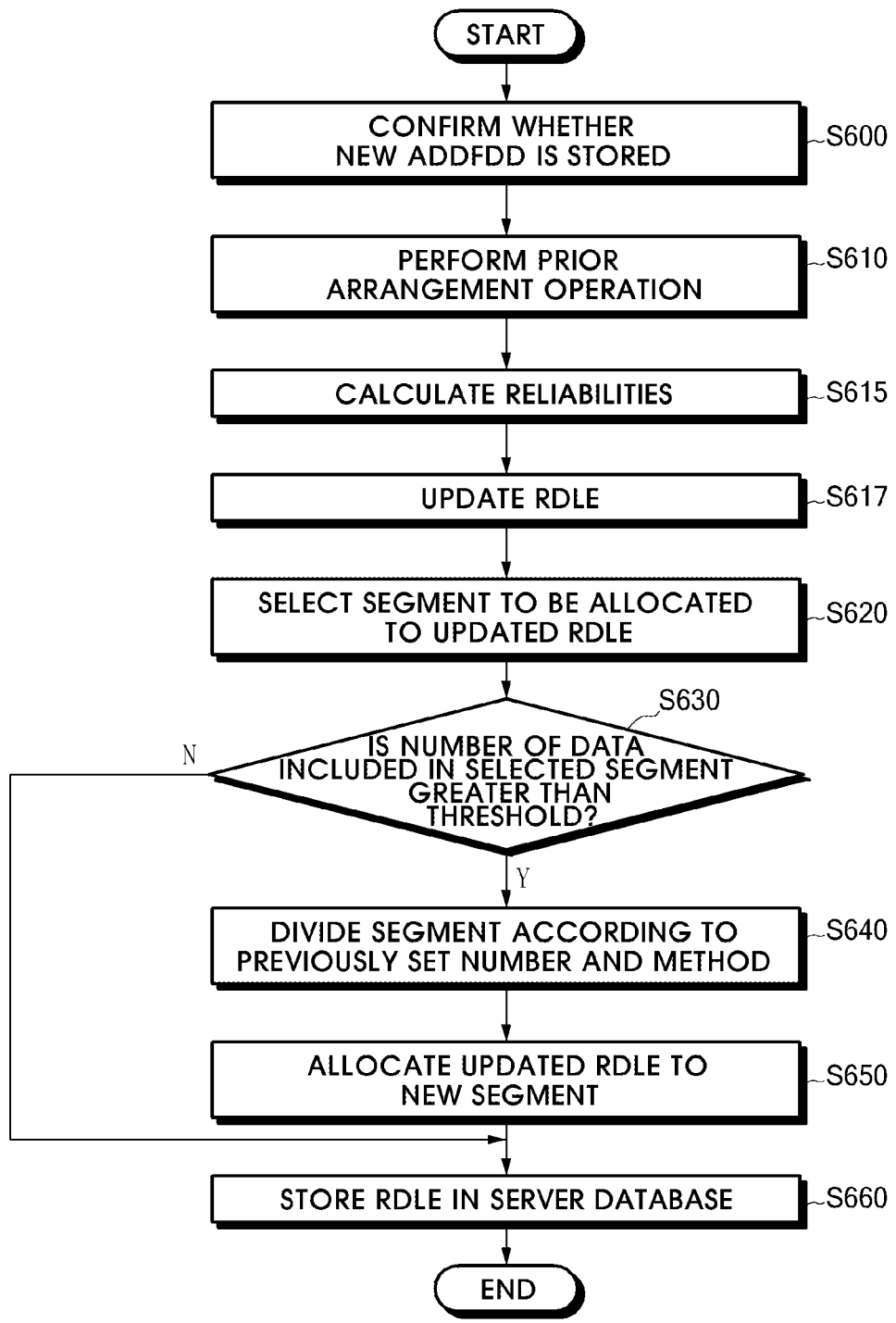
FIG. 9 is a flowchart of a process of constructing reference data for location estimation (RDLE) by using ADDFD in the location estimation server of FIG. 1 according to an embodiment of the present invention.

FIG. 9 is a flowchart of a process of constructing RDLE by using ADDFD in the location estimation server 100 according to an embodiment of the present invention. Referring to FIG. 9, the update confirming unit 131 of the location data construction engine 130 may confirm whether new ADDFD is stored in the sever database 120 (operation S600).

If the update confirming unit 131 of the location data construction engine 130 confirms that the new ADDFD is stored in the sever database 120, the data construction engine unit 133 may perform a prior arrangement operation on the new ADDFD (operation S610). The reliability calculation engine 150 may calculate reliability of data on which the prior arrangement operation is performed (operation S615).

Thereafter, the data construction engine unit 133 may remove data having reliability lower than a previously set value from the new ADDFD and update previously stored RDLE including data satisfying the reliability in the previously stored RDLE (operation S617).

According to an embodiment of the present invention, the RDLE is allocated to segments. In this case, additional operations may be performed as described below.

The data construction engine unit 133 may select a plurality of segments in order to allocate the updated RDLE to any one of the segments (operation S620).

As an example of allocating the new ADDFD to a segment, the segment to which the new ADDFD is allocated may be selected according to a location of the wireless device 1 included in the ADDFD. Referring to FIG. 4, among the segment (100,10)~(100,15) and the segment (105,10)~(110, 15), if the location of the wireless device 1 included in the new ADDFD is (101,11), the new ADDFD is allocated to the first segment, and, if the location of the wireless device 1 included in the new ADDFD is (106,11), the new ADDFD is allocated to the second segment.

As another example of allocating the new ADDFD to the segment, the data construction engine unit 133 may compare AP lists and AP signal intensities included in the new ADDFD with RDLE stored in the server database 120 and allocate the new ADDFD to segments having the same AP list.

If the number of the RDLE included in the segment to which the new ADDFD is allocated exceeds a previously set threshold (operation S630-Y), the segment may be divided again according to a previously set method (operation S640). Accordingly, the new ADDFD is allocated to any one of the divided segments (operation S650). The new ADDFD matches the allocated segment and is stored in the server database 120 as the RDLE (operation S660).

If the number of the RDLE included in the segments to which the new ADDFD is allocated does not exceed the previously set threshold (operation S630-N), the new ADDED matches the segment allocated in operation S620 and is stored in the server database 120 (operation S660).

Figure 10:
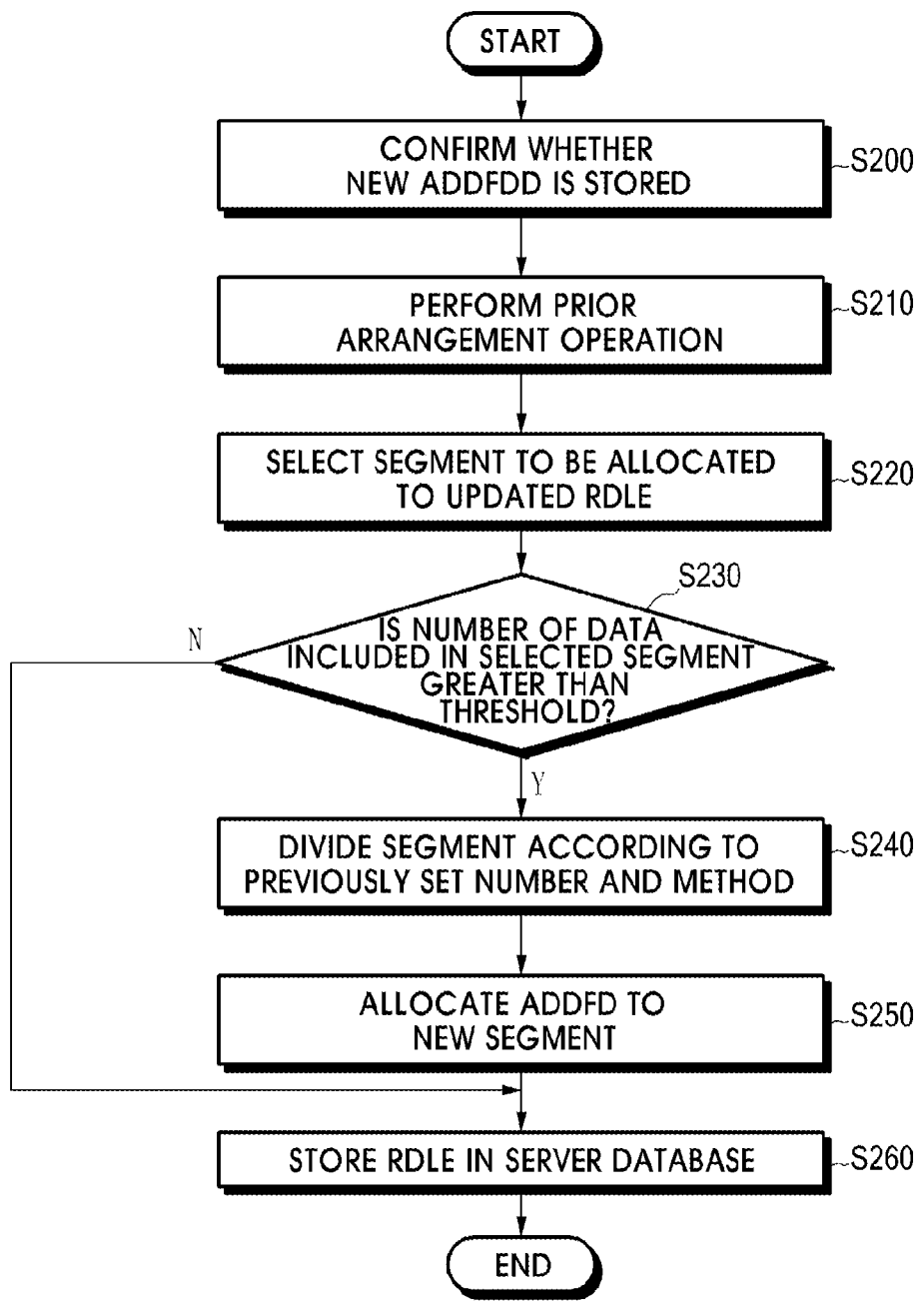
FIG. 10 is a flowchart of a process of constructing RDLE by using ADDFD in the location estimation server of FIG. 6 according to an embodiment of the present invention.

FIG. 10 is a flowchart of a process of constructing RDLE by using ADDFD in the location estimation server 600 according to an embodiment of the present invention. A process of constructing the RDLE by using the ADDFD in the location estimation server 600 will now be described with reference to FIGS. 5, 6, and 10.

The update confirming unit 631 of the RDLE construction engine 630 may confirm whether new ADDFD is stored in the server database 620 (operation S200).

If the update confirming unit 631 of the RDLE construction engine 630 confirms that the new ADDFD is stored in the server database 620, the data construction engine unit 633 performs a prior arrangement operation on ADD (operation S210). Thereafter, the data construction engine unit 633 may allocate the new ADDFD to any one of a plurality of segments (operation S220). In this regard, a method of allocating the new ADDFD to a segment is the same as described above, and thus a description thereof will not be repeated here.

If the number of RDLE included in the segment to which the new ADDFD is allocated exceeds a previously set threshold (operation 5230-Y), the segment may be divided again according to a previously set method (operation S240). Accordingly, the new ADDFD is allocated to a new segment (operation S250). The new ADDFD matches the allocated segment and is stored in the server database 620 as the RDLE (operation S260).

Figure 11:
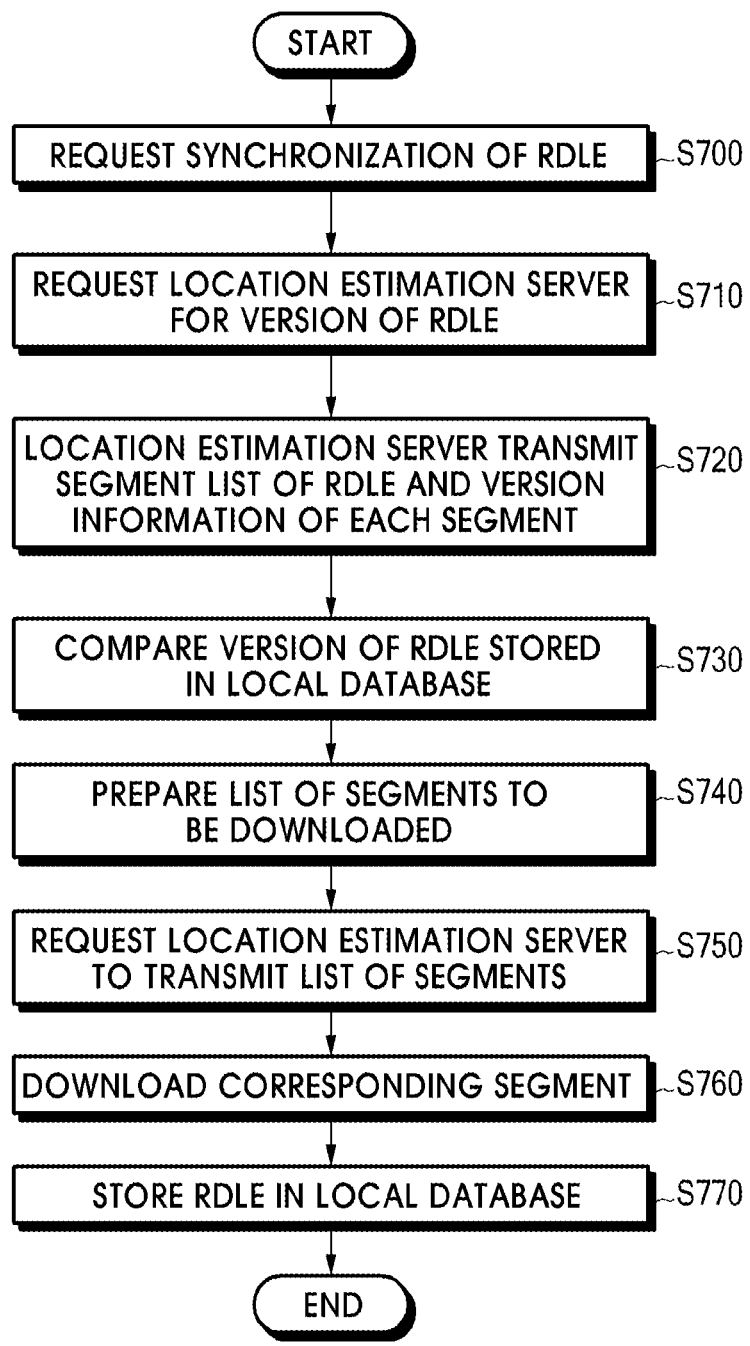
FIG. 11 is a flowchart of a process of downloading RDLE stored in a location estimation server in the wireless device of FIG. 1 according to an embodiment of the present invention.

FIG. 11 is a flowchart of a process of downloading RDLE stored in the location estimation server 100 in the wireless device 1 according to an embodiment of the present invention. According to an embodiment of the present invention, the RDLE is allocated to segments, and a user requests a synchronization of the RDLE.

Referring to FIG. 11, if the user requests the synchronization of the RDLE (operation S700), the version checker 55 of the wireless device 1 may request the version managing unit 145 of the location estimation server 100 for a version of the RDLE (operation S710). Thereafter, the version managing unit 145 may transmit a segment list of the RDLE and version information of each segment (operation S720).

The version checker 55 may compare versions of segments stored in the local database 45 of the wireless device 1 with the versions of the segments provided by the version managing unit 145 (operation S730), prepare a list of segments to be downloaded, and transfer the list of the segments to the RDLE downloader 53 (operation S740). The RDLE downloader 53 may request the RDLE transmitter 143 of the location estimation server 100 for a list of corresponding segments (operation S750), download the list of corresponding segments (operation S760), and store the RDLE of the downloaded segments in the local database 45 (operation S770). If all the segments are downloaded, a process of synchronizing the RDLE is completely performed.

Figure 12A:
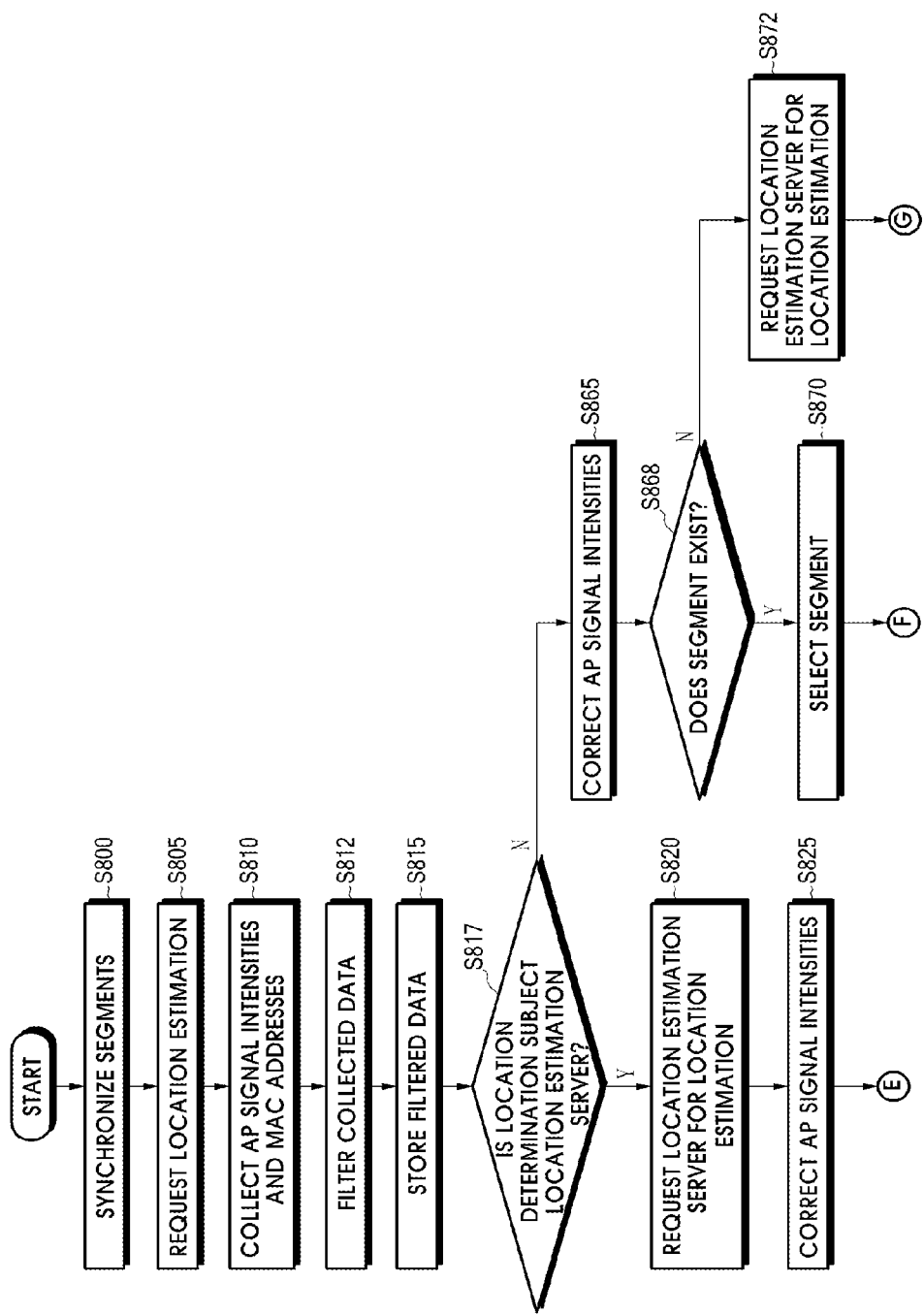
FIGS. 12A and 12B are flowcharts of a process of estimating a location of a wireless device in the location estimation server of FIG. 1 according to an embodiment of the present invention.
Figure 12B:
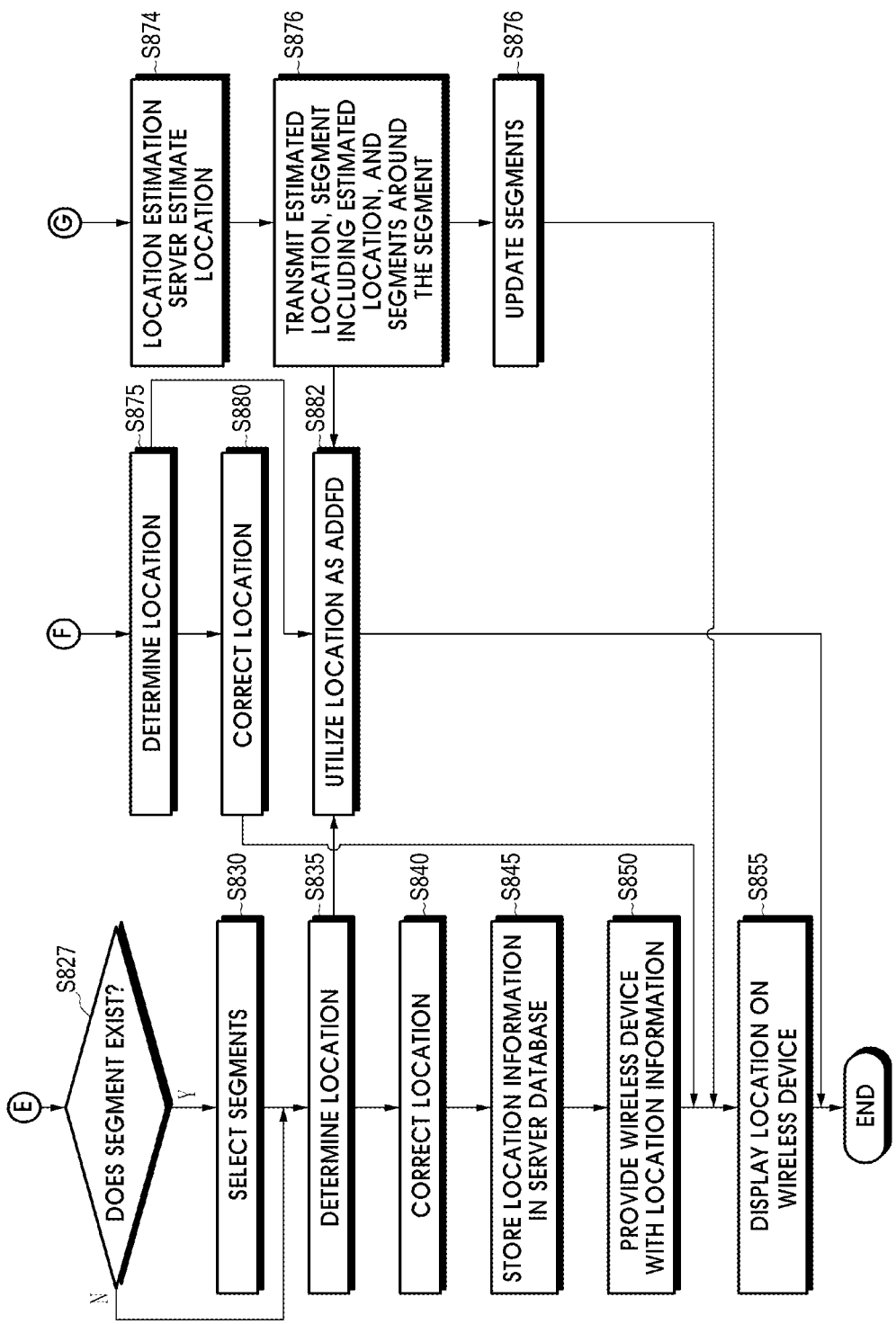

FIGS. 12A and 12B are flowcharts of a process of estimating a location of the wireless device 1 in the location estimation server 100 according to an embodiment of the present invention. Referring to FIGS. 12A and 12B, if the wireless device 1 is initialized, segments are synchronized (operation S800). Thereafter, if a location estimation request is made (operation S805), the Wi-Fi receiver 30 may collect intensities of AP signals and MAC addresses thereof (operation S810), filter the collected data (operation S812), smooth the filtered data, and store the smoothed data in the local database 45 (operation S815). Filtering of the data may include, for example, at least one of the following operations of:

i) removing a weak AP signal from the AP signals;
ii) removing an AP included in an AP delete list provided by the location estimation server 100; and
iii) smoothing an indefinite signal.

The location determination subject determining unit 21 may determine whether a location determination subject is the wireless device 1 or the location estimation server 100 (operation S817). The location determination subject is previously set as the location estimation server 100 by a user or a manager. The location determination subject determining unit 21 may determine the location determination subject as the location estimation server 100 if the wireless device 1 can communicate with the location estimation server 100. Meanwhile, although the location determination subject may be set as the wireless device 1 or the location estimation server 100 by the user or the manager, the location determination subject determining unit 21 may determine the location determination subject as the wireless device 1 if the wireless device 1 cannot communicate with the location estimation server 100.

If the location determination subject is set as the location estimation server 100 (operation S817-Y), the wireless device 1 may request the location estimation server 100 to perform location estimation (operation S820). At the location estimation request, the ADD up-loader 51 may transmit filtered ADD (intensities of AP signals and MAC addresses thereof) to the location estimation server 100.

The server location estimation engine 110 may correct the intensities of AP signals (operation S825) and determine whether segments exist (operation S827). If no segment exists (operation S827-N), the server location estimation engine 110 may determine a location by comparing RDLE with the filtered ADD.

If the segments exist (operation S827-Y), the segment determining unit 113 may compare an AP list included in the filtered ADD with an AP list stored in the server database 120 and select one or more segments including overlapping APs more than a predetermined number (operation S830).

The location estimation engine unit 115 may compare intensities of AP signals of RDLE included in the segments selected in operation S830 and extract the RDLE having the same or similar intensities of AP signals. The location estimation engine unit 115 may determine a location extracted from the RDLE as the location of the wireless device 1 (operation S835).

Information of the location is corrected by the location estimation engine unit 115 (operation S840), and is stored in the server database 120 (operation S845). Thereafter, the location is provided to the wireless device 1 (operation S850), and then the location may be displayed by a location based application of the wireless device 1 (operation S855).

Meanwhile, if the location determination subject is set as the wireless device 1 (operation S817-N), the device location estimation engine 20 may correct the intensities of AP signals included in the ADD filtered in operation S812 (operation S865), and determine whether segments exist. If no segment exists, the wireless device 1 may perform the following operations.

The wireless device 1 may request the location estimation server 100 for the location estimation (operation S872). The location estimation server 100 may estimate the location by comparing the entire RDLE with the ADD filtered in operation S812 (operation S874), and transmit the estimated location, a segment including the estimated location, and segments around the segment to the wireless device 1 (operation S876). The wireless device 1 may update previously stored segments to the received segments (operation S876). Meanwhile, the location estimated by the location estimation server 100 in operation S874 may be utilized as the ADDFD, along with the intensities of AP signals and MAC addresses collected in operation S810.

If the segments exist (operation S868-Y), the location estimation engine unit 23 compares the AP lists included in the ADD with the AP list of each segment stored in the local database 45. In this regard, the location estimation engine unit 23 may select the segments including the same AP list as that included in the ADD or including the same AP list more than a predetermined number (operation S870). RDLE including the same or similar AP signal intensities may be extracted by comparing the AP signals of the RDLE included in the segments with the AP signals included in the ADD.

The location estimation engine unit 23 may determine a location extracted from the RDLE as the location of the wireless device 1 (operation S875). Thereafter, the determined location may be corrected through a filtering operation, provided to the wireless device 1 (operation S850), and displayed by the location based application of the wireless device 1 (operation S855).

According to an embodiment of the present invention, the location estimated by the location estimation server 100 or the wireless device 1 may be utilized as the ADDFD (operation S882). That is, the locations determined in operations S835 and S875 may be filtered and then added to the RDLE.

Figure 13:
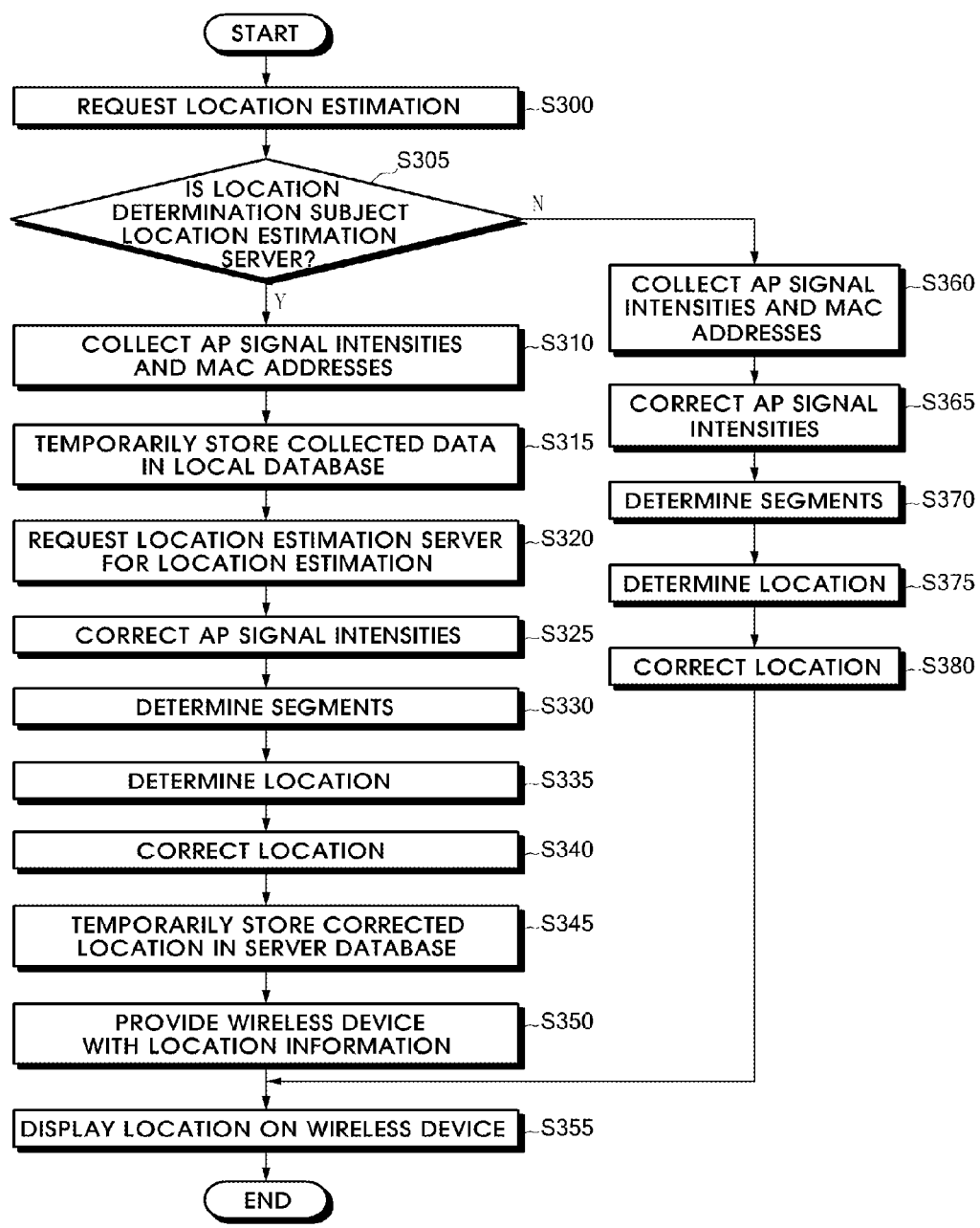
FIG. 13 is a flowchart of a process of estimating a location of a wireless device in the location estimation server of FIG. 6 according to an embodiment of the present invention.

FIG. 13 is a flowchart of a process of estimating a location of the wireless device 501 in the location estimation server 600 according to an embodiment of the present invention. The process of estimating the location of the wireless device 501 in the location estimation server 600 of the present embodiment will now be described with reference to FIGS. 5, 6, and 13.

If the wireless device 501 requests the location estimation server 600 to estimate the location (operation S300), the location determination subject determining unit 521 may determine whether a location determination subject is the wireless device 501 or the location estimation server 600 (operation S305). The location determination subject was previously set as the location estimation server 600 by a user. If the wireless device 501 can communicate with the location estimation server 600, the location estimation server 500 is a subject for determining the location. Meanwhile, if the location determination subject is previously set as the wireless device 501 by the user, or if the wireless device 501 cannot communicate with the location estimation server 600, the location determination subject is set as the wireless device 1.

If the location determination subject is set as the location estimation server 600 (operation 5305-Y), the Wi-Fi receiver 530 may collect intensities of AP signals and MAC addresses thereof (operation S310) and temporarily store the collected data in the local database 545 (operation S315). The ADD up-loader 551 transmits the temporarily stored data to the location estimation server 600 and thus the location estimation is requested (operation S320).

A signal correction unit of the server location estimation engine 110 corrects the intensities of AP signals (operation S325). The segment determining unit 113 compares AP lists included in the ADD with AP lists stored in the server database 620, and selects one or more segments including overlapping APs more than a predetermined number (operation S330). Thereafter, the location estimation engine unit 115 compares intensities of AP signals of RDLE included in the segments and extracts the RDLE having the same or similar intensities of AP signals. A location included in the extracted RDLE is the location of the wireless device 1 (operation S335). A location correction unit of the server location estimation engine 110 may correct the location by using various filter algorithms (operation S340).

The corrected location is temporarily stored in the server database 620 (operation S345), and is provided to the wireless device 501 (operation S350). Thereafter, a location display application of the wireless device 501 operates, displays a map on a display unit of the wireless device 501, and displays the location of the wireless device 501 on the map (operation S355).

Meanwhile, if the location determination subject is set as the wireless device 501 (operation S305-N), the intensities of AP signals and the MAC addresses thereof received from the Wi-Fi receiver 530 are provided to the device location estimation engine 520 (operation S360). The device location estimation engine 520 corrects the intensities of AP signals (operation S365), compares AP lists included in the ADD with AP lists stored in the local database 545, and selects one or more segments including overlapping APs more than a predetermined number (operation S370). Thereafter, the device location estimation engine 520 compares intensities of AP signals of RDLE included in the segments, extracts the RDLE having the same or similar intensities of AP signals, and determines the location of the wireless device 501 (operation S375). The location is corrected (operation S380). The location display application of the wireless device 501 operates, displays a map on the user interface 501, and displays the location of the wireless device 501 on the map (operation S355).

Figure 14:
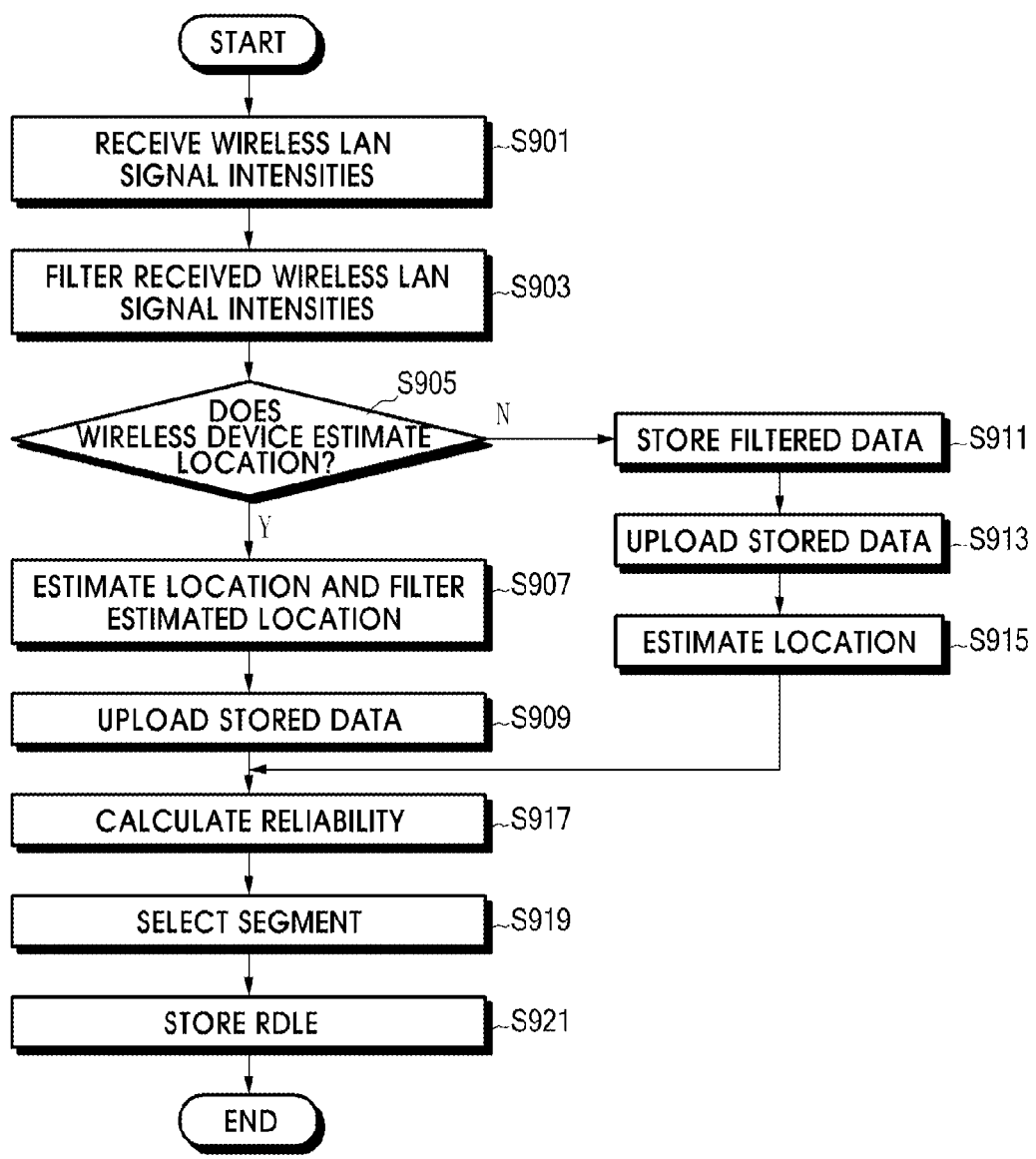
FIG. 14 is a flowchart of a process of constructing RDLE according to an embodiment of the present invention.

FIG. 14 is a flowchart of a process of constructing RDLE according to an embodiment of the present invention. FIG. 14 exemplarily illustrates a method of contrasting the RDLE by using the device location estimation engine 20 of the wireless device 1 or the server location estimation engine 110 of the location estimation server 100.

Referring to FIG. 14, the Wi-Fi receiver 30 may collect intensities of wireless LAN AP signals at a current location of the wireless device 1 (operation S901). The ADD filter 60 may remove indefinite data from the collected intensities of wireless LAN AP signals and smooth the indefinite data (operation S903).

If the wireless device 1 estimates a location thereof (operation S905-Y), the device location estimation engine 20 may estimate a current location of the wireless device 1 based on the data filtered in operation S903. The ADD filter 60 may perform a filtering operation of removing indefinite data from the estimated location or smoothing the indefinite data (operation S907).

Thereafter, the estimated location and the filtered data are uploaded to the location estimation server 100 (operation S909). The reliability calculation engine 150 may calculate reliability of the uploaded data. The data construction engine unit 133 may update existing RDLE by removing data having reliability lower than a previously set reference value from the uploaded data and adding the remaining data to the existing RDLE.

The location data construction engine 130 may select segments according to a predetermined standard (operation S919), allocate the RDLE updated by the data construction engine unit 133 to the selected segments, and store the allocated RDLE (operation S921).

If the location estimation server 100 estimates the location of the wireless device 1 (operation S905-N), the filtered data may be stored in the local database 45 (operation S911), and uploaded to the location estimation server 100 (operation S913). The server location estimation engine 110 may estimate the location based on the uploaded data (operation S915). Thereafter, the reliability calculation engine 150 may calculate reliability of the uploaded data (operation S917). The data construction engine unit 133 may update existing RDLE by removing data having reliability lower than the previously set reference value from the uploaded data and adding the remaining data to the existing RDLE. Thereafter, operations S919 through S921 may be performed.

As described above, in the present embodiment, the two modes can be used to secure the RDLE at a current location of a user who has no GPS. If a location estimation engine is used to generate the RDLE based on an estimated location of the user, although the RDLE may be more indefinite than data collected by a GPS receiver, an ADD filter of a wireless device and a reliability calculator of a location estimation server may supplement accuracy of the RDLE.

For example, a location collected by the GPS may be calculated to have reliability lower than that of a location estimated by the location estimation engine. Thereafter, since the location is estimated in consideration of the reliability, an error of location estimation can be reduced.

According to an embodiment of the present invention, a computer readable recording medium having recorded thereon a program for executing the location tracking methods of a wireless device is provided.

According to an embodiment of the present invention, a database used to estimate a location of a wireless device in real time by using a wireless LAN AP may be stored in a location estimation server. For example, the database may store at least two ore more SRDLE including locations, a list of APs corresponding to the locations, signal intensities of the APs included in the list of APs, and reliabilities of the APs included in the list of APs. Further, if the database receives a keyword including an AP list and intensities of AP signals from outside, the database may select the SRDLE satisfying a predetermined standard based on the keyword from among the SRDLE and provide information on a location included in the selected SRDLE.

Figure 15:
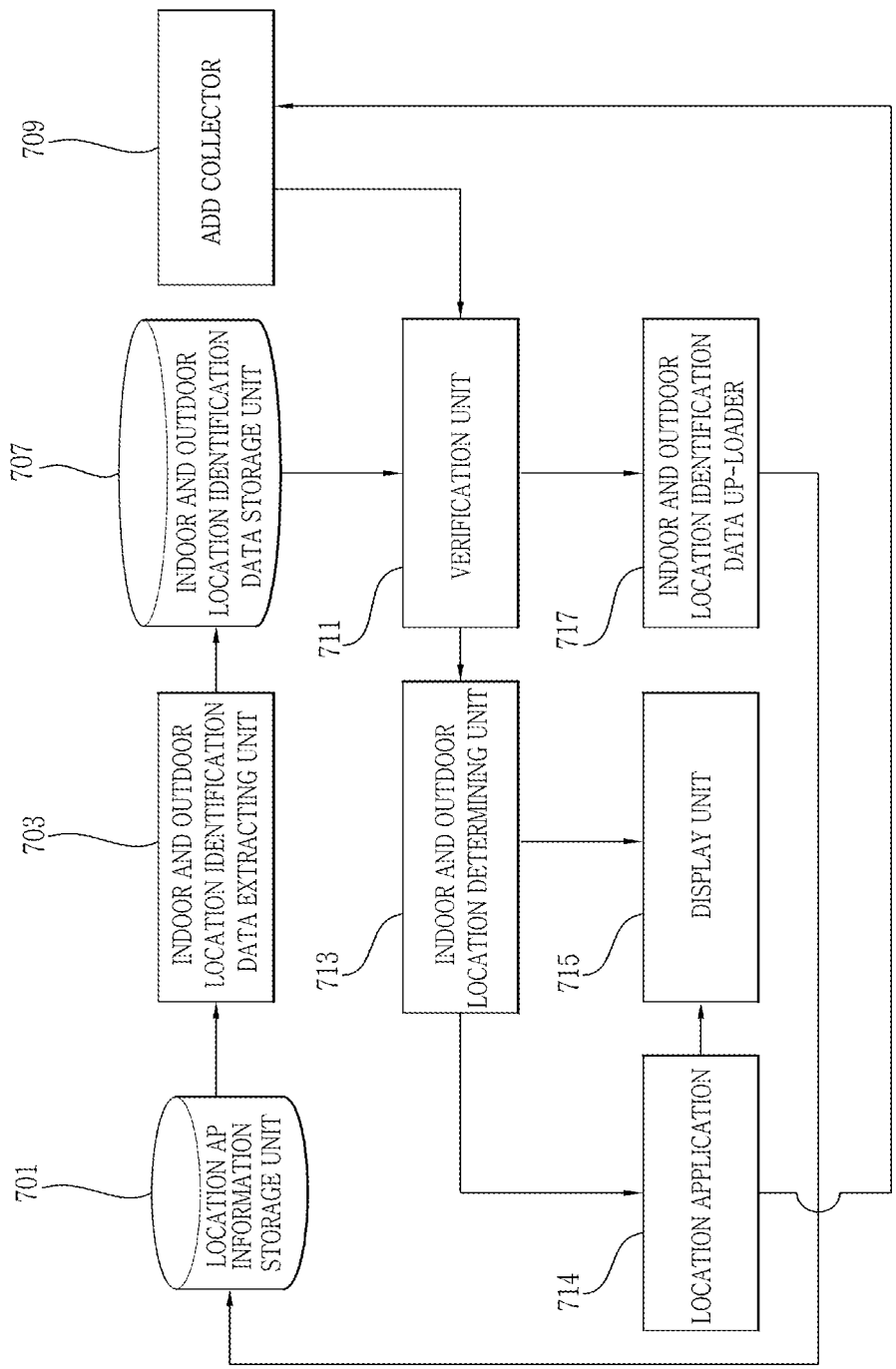
FIG. 15 is a block diagram of a wireless LAN based seamless location tracking system between indoors and outdoors according to an embodiment of the present invention.

FIG. 15 is a block diagram of a wireless LAN based seamless location tracking system between indoors and outdoors according to an embodiment of the present invention. Referring to FIG. 15, the wireless LAN based seamless location tracking system between indoors and outdoors of the present embodiment (hereinafter referred to as a "seamless location tracking system") includes a location AP information storage unit 701, an indoor and outdoor location identification data extracting unit 703, an indoor and outdoor location identification data storage unit 707, an ADD collector 709, a verification unit 711, an indoor and outdoor location determining unit 713, a location application 714, a display unit 715, and an indoor and outdoor location identification data up-loader 717.

The location AP information storage unit 701 stores an AP list for each location indoors or outdoors. In this regard, the AP list for each location may be data corresponding to the RDLE. The AP list for each location stored in the location AP information storage unit 701 may be generated by using the method of generating the RDLE described with reference to FIGS. 1 through 14. To this end, the seamless location tracking system of the present embodiment may further include a location estimation engine. A detailed description of the location estimation engine was provided in the embodiments described above, and thus it will not be repeated here. Further, the ADD collector 740 may have a function similar to that of the ADD collectors 40 and 540 described with reference to FIGS. 1 through 14.

The AP list for each location may be, for example, in the form of a table as shown in Table 3 above.

Although Table 3 does not include a detection time, the detection time may be further included in the AP list for each location according to an embodiment of the present invention. Further, although Table 3 includes the reliability, the reliability may not be included according to an embodiment of the present invention.

The indoor and outdoor location identification data extracting unit 703 extracts data (hereinafter referred to as "KAS data") for identifying indoors and outdoors from the AP list for each location stored in the location AP information storage unit 701.

The indoor and outdoor location identification data extracting unit 703 of the present embodiment extracts the KAS data regarding all possible indoors around a current location for which indoors and outdoors are to be identified from the AP list for each location stored in the location AP information storage unit 701.

The indoor and outdoor location identification data extracting unit 703 of the present embodiment may select a list of all AP signals included in a specific indoor region from the AP list for each location, and, if differences between intensities of the AP signals included in the selected list of all AP signals and intensities of AP signals outdoor neighboring the specific indoor region are greater than a threshold, extract AP signals included in the specific indoor region as the KAS data.

Further, the indoor and outdoor location identification data extracting unit 703 may extract the KAS data regarding all possible indoors in accordance with a location history previous to a current time.

The KAS data extracted by the indoor and outdoor location identification data extracting unit 703 may include at least one or more pieces of SKAS data. For example, although one piece of KAS data for each indoors is extracted in small indoors, since the intensities of the AP signals cannot cover all broad indoors, each of broad indoors is divided into segments, and the KAS data for each segment is extracted. In the present specification, the KAS data allocated for each segment is often referred to as SKAS data.

Table 7 below exemplarily shows SKAS data allocated for each segment.

TABLE 7

| KAS | SKAS | Location | AP Identification Information |
|---|---|---|---|
| KAS1 | SKAS1 | PA | ID1 |
| | | PB | ID2 |
| | | PC | ID3 |
| | SKAS2 | PD | ID4 |
| | | PE | ID5 |
| KAS2 | | PF | ID6 |
| KAS3 | SKAS1 | PG | ID7 |
| | | PH | ID8 |
| | SKAS2 | PI | ID9 |
| | | PJ | ID10 |
| | | PK | ID11 |
| | SKAS3 | PL | ID12 |
| | | PM | ID13 |

In Table 6, PA, PB, . . . , PM are location information, such as latitude and longitude, ID1, ID2, . . . , ID13 is identification information, such as MAC addresses of APs. A method of extracting the KAS data will be described in more detail later with reference to FIG. 17.

If an indoor region is divided into segments, the data for identifying indoors and outdoors includes a list of APs having a detected specific probability threshold in each divided region, and a list of APs having a difference between signal intensities in an indoor and outdoor boundary region greater than a specific threshold.

The indoor and outdoor location identification data storage unit 707 stores the KAS data extracted by the indoor and outdoor location identification data extracting unit 703.

The ADD collector 740 collects ADD including AP signal intensities and AP identification information. According to an embodiment of the present invention, the ADD collector 707 collects the ADD at a request of the location application 714.

The ADD may be, for example, constructed as listed in Table 2 above. Although Table 2 does not include a detection time, the detection time may be further included in the ADD according to an embodiment of the present invention.

The verification unit 711 verifies the ADD collected by the ADD collector 740. According to an embodiment of the present invention, the verification unit 711 verifies the ADD by comparing the KAS data extracted by the indoor and outdoor location identification data extracting unit 703 with the ADD collected by the ADD collector 740.

According to an embodiment of the present invention, the verification unit 711 may verify whether the KAS data includes an error (for example, an error caused by deleting, moving, and adding an AP) based on the ADD. The verification unit 711 corrects the KAS if the KAS data is verified to have the error. The corrected KAS data is transmitted to the location AP information storage unit 701 through the indoor and outdoor location identification data up-loader 717 that will be described later. The location AP information storage unit 701 renews the previously stored KAS data as the corrected KAS data and stores the renewed KAS data.

A method of determining whether the KAS data includes the error in the verification unit 711 will now be described.

The verification unit 711 compares the ADD that is continuously collected by the ADD collector 740 with the KAS data extracted by the indoor and outdoor location identification data extracting unit 703. For example, if the ADD includes AP1, AP2, AP3, AP4, and AP5 that are continuously collected, a SKAS includes AP1, AP2, AP3, and AP4, and a KAS of a corresponding indoors does not include AP5, the SKAS is determined to have an error and is determined to further include AP5. To the contrary, if the SKAS includes AP1, AP2, AP3, AP4, and AP5, and the ADD includes AP1, AP2, AP3, and AP4 that are continuously collected, AP5 is determined to be deleted from the SKAS. However, preferably, since the ADD is reliable when a collection number of the ADD is greater than a predetermined value, a deletion or addition of an AP is determined when the collection number of the ADD is greater than the predetermined value.

Meanwhile, although an AP of the KAS data is in different indoor regions, if the AP is determined to be in the same indoor region several times as a result of collecting the ADD, the AP is determined to have moved.

According to an embodiment of the present invention, the verification unit 711 compares the KAS data extracted by the indoor and outdoor location identification data extracting unit 703 with the ADD collected by the ADD collector 740 and verifies whether the ADD is meaningful as the data for identifying indoors and outdoors.

For example, the verification unit 711 verifies whether the ADD collected by the ADD collector 740 is data that is to be stored in the location AP information storage unit 701. For example, when continuously comparing the ADD that is being collected with the KAS data, if an addition or a deletion of an AP to or from the ADD, or many movements of the AP are expected, the verification unit 711 may determine that the ADD is not to be stored in the location AP information storage unit 701.

The indoor and outdoor location determining unit 713 compares the ADD collected by the ADD collector 740 with the KAS data extracted by the indoor and outdoor location identification data extracting unit 703 and determines whether an wireless device is indoors or outdoors.

According to an embodiment of the present invention, the indoor and outdoor location determining unit 713 compares the ADD verified by the verification unit 711 with the KAS data and determines whether the wireless device is indoors or outdoors.

According to an embodiment of the present invention, the indoor and outdoor location determining unit 713 compares the KAS data stored in the indoor and outdoor location identification data storage unit 707 with the verified ADD and determines whether the wireless device is indoors or outdoors.

According to an embodiment of the present invention, if there is KAS data include all APs included in the ADD, the indoor and outdoor location determining unit 713 determines that an AP has entered into indoors. For example, if AP1, AP2, and AP3 are included in the ADD, KAS data of a building A includes AP2, P3, and AP4, KAS data of a building B includes AP1, AP2, and AP3, and KAS data of a building C includes AP0, AP1, AP2, AP4, and AP5, the indoor and outdoor location determining unit 713 determines that the wireless device has entered into the building B.

According to an embodiment of the present invention, the indoor and outdoor location determining unit 713 determines that wireless devices are still indoors if any one of the APs included in the collected ADD is included in the KAS data after having entered into indoors. In the above example, after the wireless devices have entered into the building B, even though the ADD includes AP2, AP6, and AP7, the wireless devices are determined to still be in the building B.

The meaning of the "APs having a detected specific probability threshold" is explained by an example of a place, Coexmall. It is assumed that KAS data regarding a region KA of Coexmall includes six APs of A, B, C, D, E, and F, and an error threshold (corresponding to a specific probability) is ¾. If a list of APs detected by the ADD collector 740 includes A, C, D, E, and F, since the list of APs satisfies the error threshold, the indoor and outdoor location determining unit 713 determines that the APs have entered into the region KA of Coexmall.

The location application 714 is a location based application and may be an application such as MAP. The location application 714 is stored in a storage unit (not shown), operates after being loaded in a memory, and requests the ADD collector 740 to collect the ADD.

According to an embodiment of the present invention, the location application 714 may provide an indoor or outdoor location based service according to a determination result of the indoor and outdoor location determining unit 713.

The display unit 715 may be a monitor such as a LCD, and may display a service provided by the location application 714.

If the KAS data is corrected by the verification unit 711, the indoor and outdoor location identification data up-loader 717 transmits the corrected KAS data to the location AP information storage unit 701. The indoor and outdoor location identification data up-loader 717 confirms whether the KAS data is corrected periodically or non-periodically, and, if the KAS data is corrected, and transmits the corrected data to the location AP information storage unit 701.

Meanwhile, the elements of the seamless location tracking system of FIG. 15, i.e., the location AP information storage unit 701, the indoor and outdoor location identification data extracting unit 703, the indoor and outdoor location identification data storage unit 707, the ADD collector 740, the verification unit 711, the indoor and outdoor location determining unit 713, the location application 714, the display unit 715, and the indoor and outdoor location identification data up-loader 717, may be located in physically different spaces.

For example, the ADD collector 740, the verification unit 711, the indoor and outdoor location determining unit 713, the location application 714, the display unit 715, and the indoor and outdoor location identification data up-loader 717 may be realized in a wireless device, such as a cellular phone, and the other elements may be realized as separate servers.

For another example, the ADD collector 740, the location application 714, the display unit 715, and the indoor and outdoor location identification data up-loader 717 may be realized in the wireless device, such as the cellular phone, and the other elements may be realized as separate servers.

For another example, the indoor and outdoor location identification data storage unit 707, the ADD collector 740, the verification unit 711, the indoor and outdoor location determining unit 713, the location application 714, the display unit 715, and the indoor and outdoor location identification data up-loader 717 may be realized in the wireless device, such as the cellular phone, and the other elements may be realized as separate servers.

For another example, the ADD collector 740, the location application 714, and the display unit 715 may be realized in the wireless device, such as the cellular phone, and the other elements may be realized as separate servers.

For another example, the location application 714 may be realized as an independent system, such as a push system, and the ADD collector 740, the verification unit 711, the indoor and outdoor location determining unit 713, the display unit 715, and the indoor and outdoor location identification data up-loader 717 may be realized in the wireless device, such as the cellular phone, and the other elements may be realized as separate servers.

Figure 16:
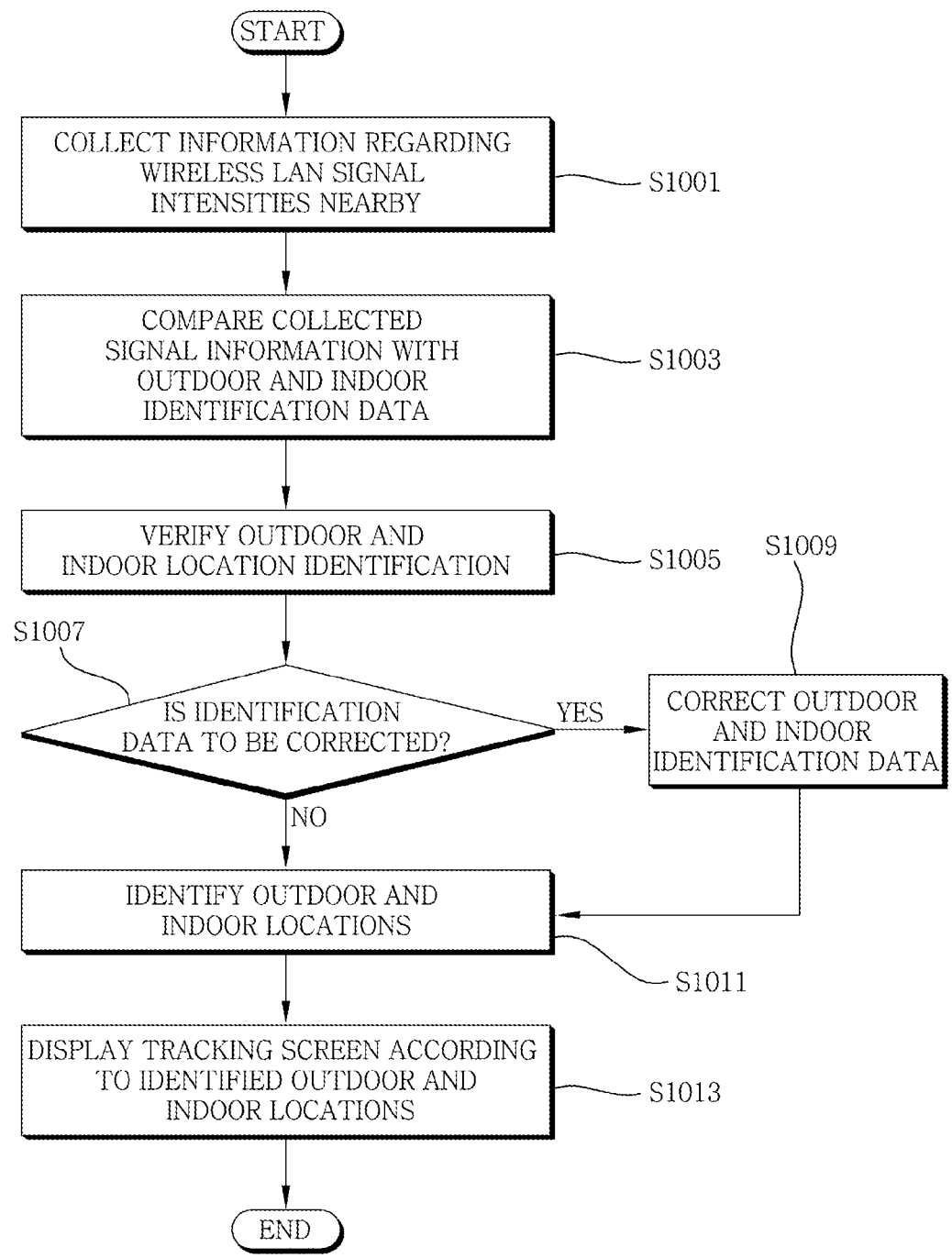
FIG. 16 is a flowchart of a wireless LAN based seamless location tracking method between indoors and outdoors according to an embodiment of the present invention.

FIG. 16 is a flowchart of a wireless LAN based seamless location tracking method between indoor and outdoor according to an embodiment of the present invention. Referring to FIG. 16, in the wireless LAN based seamless location tracking method between indoors and outdoors (hereinafter referred to as the "seamless location tracking method") of the present embodiment, at a request of the location application 714, the ADD collector 740 collects an AP list including identification information of AP signals and intensities thereof (operation S1001). More specifically, in operation S1001, the ADD collector 740 may collect wireless LAN signals nearby and intensities thereof. A collection time may be further included in the AP list.

The verification unit 711 compares KAS data store in the indoor and outdoor location identification data storage unit 707 with ADD collected by the ADD collector 740 (operation S1003), verifies whether the collected ADD is meaningful data based on the KAS data, and verifies whether the KAS data includes an error based on the collected ADD (operation S1005).

If the KAS data is determined to be corrected (operation S1007: Yes), the verification unit 711 corrects the KAS data (operation S1009). The indoor and outdoor location determining unit 713 determines whether an wireless devices is indoors or outdoors by using the KAS data (operation S1011).

The location application 714 displays a location based service on the display unit 715 based on a determination result of the indoor and outdoor location determining unit 713 (operation S1013).

Figure 17:
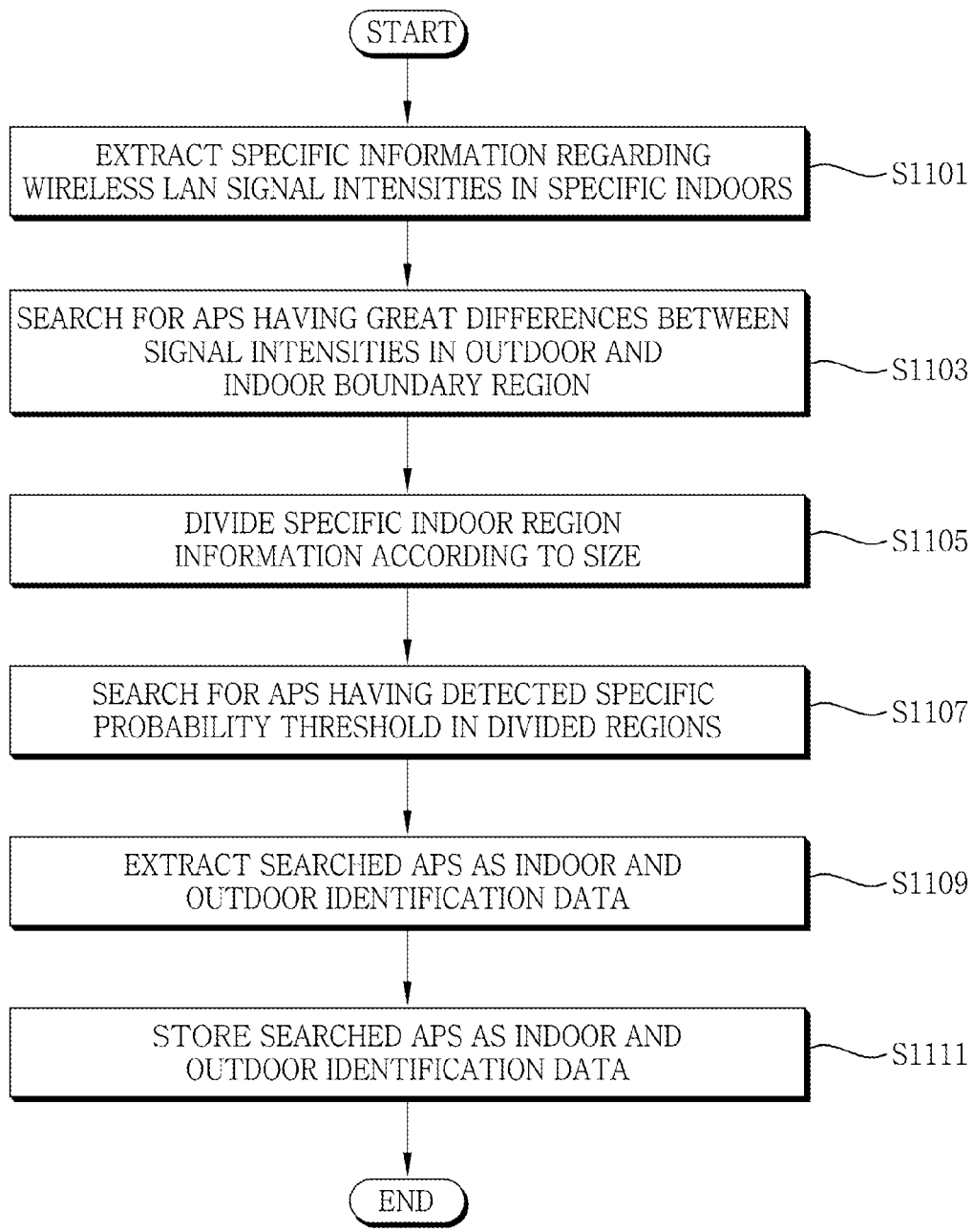
FIG. 17 is a flowchart of a method of extracting indoor and outdoor identification data according to an embodiment of the present invention.

FIG. 17 is a flowchart of a method of extracting indoor and outdoor identification data according to an embodiment of the present invention. Referring to FIG. 17, the indoor and outdoor location identification data extracting unit 703 extracts an AP list included in a specific indoor region that is to be identified from outdoor from an AP list for each location stored in the location AP information storage unit 701 (operation S1101). In this regard, the AP list includes AP identification information and AP signal intensities. For example, if the indoor and outdoor location identification data extracting unit 703 extracts KAS data for identifying indoors and outdoors of Coexmall, the indoor and outdoor location identification data extracting unit 703 extracts a list of all APs of indoors and outdoors on a latitude and longitude of a place where Coexmall is located.

The indoor and outdoor location identification data extracting unit 703 searches for APs having a great difference between intensities of AP signals indoors and intensities of AP signals in an indoor and outdoor boundary from the extracted AP list (operation S1103) and constructs an AP list. Preferably, the indoor and outdoor location identification data extracting unit 703 searches for APs having a difference between the AP signals indoors and the AP signals in the indoor and outdoor boundary greater than a previously set threshold and constructs the AP list.

If the specific indoor region is not broad, operation S211 that will be described later is performed, and, if the specific indoor region is broad, the specific indoor region is divided by a predetermined size (operation S1105). In this regard, in operation S205, a size of the specific indoor region exceeds coverage of an intensity of a wireless LAN signal transmitted by an AP.

The indoor and outdoor location identification data extracting unit 703 searches for APs having a detected specific probability threshold in divided regions from the AP list extracted in operation S201 (operation S1107), and extracts the searched APs as indoor and outdoor identification data (operation S1109). In this regard, the searched APs are stored in the indoor and outdoor location identification data storage unit 707 as the indoor and outdoor identification data (SKAS) for each region (operation S1111).

In the present embodiment, if the size of the specific indoor region exceeds coverage of the intensity of the wireless LAN signal transmitted by the AP, the specific indoor region is divided, in order to search for the APs having the detected specific probability threshold in the divided regions. If a specific indoor region is not divided, an AP is not detected in the specific indoor region exceeding coverage of an intensity of a wireless LAN signal transmitted by a specific AP, and thus the APs having the detected specific probability threshold cannot be searched for. Therefore, the AP list was prepared by dividing the specific indoor region and searching for APs having a detected specific probability threshold in the divided regions. Thus, the indoor and outdoor location determining unit 713 determines that the APs have entered into Coexmall based on the AP list collected by the ADD collector 740, for example, if all the APs having the detected specific probability threshold exist in Coexmall. As described above, after having entered into indoors once, if an AP having the detected specific probability threshold exists, the APs are determined to continuously stay indoors, and, if no AP having the detected specific probability threshold exists, the APs are determined to move out outdoors from Coexmall.

Figure 18:
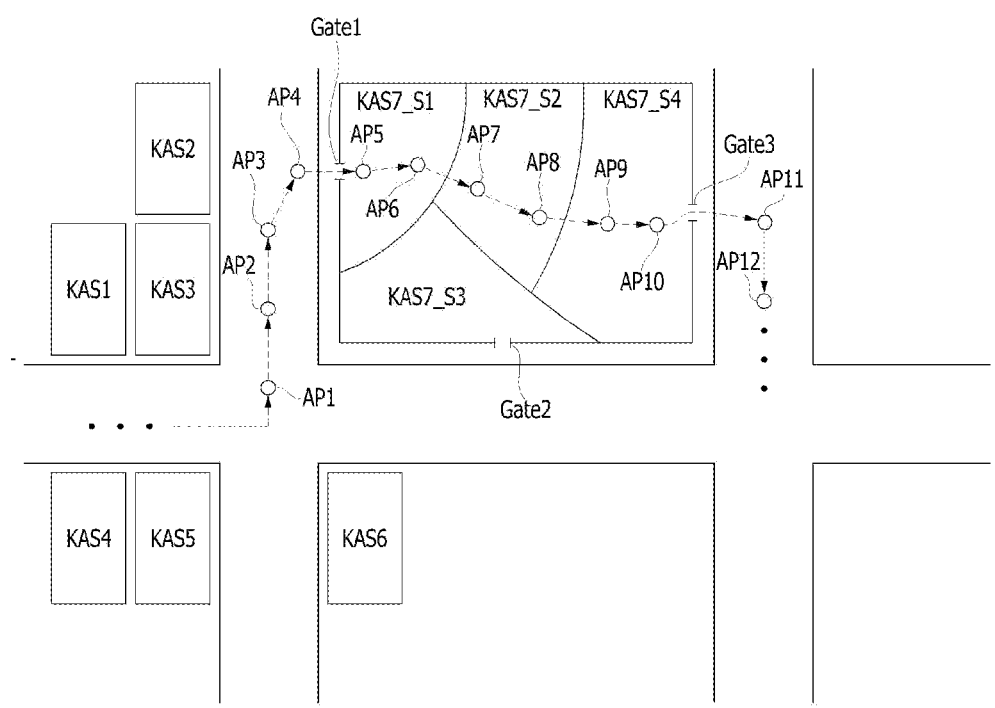
FIG. 18 is a diagram for explaining a wireless LAN based seamless location tracking system between indoors and outdoors according to an embodiment of the present invention.

FIG. 18 is a diagram for explaining a wireless LAN based seamless location tracking system between indoors and outdoors according to an embodiment of the present invention. Referring to FIG. 18, a holder of a wireless device realized by the seamless location tracking system between indoors and outdoors of the present embodiment moves to paths AP1, AP2, . . . , AP11, and AP12. In this regard, KAS7_S1, KAS7_S2, KAS7_S3, or KAS7_S4 are, respectively, SKAS allocated to segments, and are referred to as KAS7 as a whole for descriptive convenience.

When the holder of the wireless device is located in the path AP1, the wireless device compares ADD collected at a current location of the wireless device with KAS data and determines whether the wireless device is located indoors. In this regard, the KAS data may include KAS1, KAS3, KAS4, KAS5, KAS6, and KAS7. According to an embodiment of the present invention, the KAS data that are comparative objects may be extracted based on a location history of the wireless device in order to compare the ADD with the KAS data closest to the current location of the wireless device.

An indoor and outdoor location determining unit realized in the wireless device compares an AP list collected the path AP1 with KAS1, KAS3, KAS4, KAS5, KAS6, and KAS7.

In the same manner, when the holder sequentially moves to the paths AP2, AP3, and AP4, and enters into the path AP5, an AP list detected at the path AP5 is included in KAS7_S1, and thus the wireless device is determined to have entered into indoors. Thereafter, the holder moves paths from AP5 to AP10, and, if an AP included in the collected ADD is included in KAS7, the wireless device is determined still to be indoors.

When the holder of the wireless device moves a path AP11, no AP included in the ADD is included in KAS7, and thus the wireless device is determined to be outdoors.

As described above, the seamless location tracking system between indoors and outdoors of the present embodiment may provide a seamless path guide to a destination of a client and notify a location of the client in real time even if the client requests any destination information indoors and outdoors.

Further, the seamless location tracking system between indoors and outdoors of the present embodiment may be connected to a push system, determine that the client enters into or move out to a specific region, and receive a specific content or service in accordance with a state of the client. In this regard, the push system provides a specific location with specific content.

Further, the seamless location tracking system between indoors and outdoors of the present embodiment may be connected to a server that estimates and stores the location of the client in real time, and receive marketing information inferred from information regarding a frequently visiting region of each client and a next visiting region after a specific visiting region by analyzing movement directions and patterns of clients.

The wireless LAN based seamless location tracking method between indoors and outdoors described above can be embodied as a computer readable recording medium storing a program. According to another embodiment of the present invention, the program can be stored on a computer readable recording medium and driven thereon.

The wireless device indicated in the present specification is used to encompass all wireless devices for utilizing location information, such as a cellular phone, a smart phone, a PDA, a net book, a navigation device, etc. Further, the wireless LAN based seamless location tracking system can be embodied in software and/or hardware and/or firmware, etc.

The present invention described above may be utilized, for example, in the following fields. For example, the present invention may be utilized as a pedestrian navigation device. Although an existing navigation device can be used to track a moving car due to a large error range, the present invention can be applied to the pedestrian navigation device that is seamlessly connected to indoors and outdoors. For example, it is possible to precisely estimate a location in a complex indoors, such as Coexmall.

For another example, the present invention can be applied to a physical distribution or a property management. Location estimation is performed by attaching tags on properties that are being managed by a company or a factory, thereby reducing a risk of loss of the properties by tracking where the properties are or where they are moving in real time. Further, when the properties are kept or moving, places where the properties are kept and moving lines of the properties are optimally set, thereby reducing carriage expenses. In addition, a moving state of the physical distribution can be provided to customer in real time.

For another example, the present invention can be applied to a location based push system. In this case, if a user goes to a specific location, a designated message can be pushed and provided to the user. Alternatively, the present invention can be connected to a home network system of a U-city. For example, if the user turns gas on and leaves home, a message indicating that the user goes back home and turns it off can be given to the user.

For another example, the present invention can be applied to a friend finding function. Among friends included in a group to which the user belongs, a friend nearby is displayed so that the user can send a message to the friend or meet the friend.

In the present invention, a database is constructed by using a location of a wireless device input through a GPS, a user's input, and a location tracking algorithm, and AP signals received by the wireless device, and is used to determine the location of the wireless device in real time. Thus, a seamless location tracking technology can be provided outdoors and indoors where no GPS tracking is performed as well, thereby providing users with seamless location based services. In this regard, among the seamless location based services, location tracking services include a security and access management, a missing child search, a property management, etc., and location related information services include a location based customized content providing service, a location circumstance guide service, etc.

ADDFD collected by the wireless device is used to construct RDLE, which needs no additional location collection equipment and reduces initial expense and management and repair expenses.

The RDLE that is divided into segments is stored and managed, which reduces generation of unnecessary RDLE when new ADDFD is added, and facilitates construction of data. Further, when the RDLE is provided to the wireless device, the RDLE can be downloaded in segment units, thereby reducing an amount of communication between the wireless device and a location estimation server, and preventing an unnecessarily excessive storage space from being occupied. When a device location estimation engine or a server location estimation engine estimates the location of the wireless device, a predetermined number of segments and RDLE included in a corresponding segment are searched for, thereby maintaining a definite level of system performance.

Further, ADD is filtered and RDLE having reliability is constructed, thereby continuously maintaining a definite level of accuracy of location estimation.

Furthermore, determination between indoors and outdoors and seamless location tracking are possible in a wireless LAN environment, without using a technology requiring an additional resource, such as a GPS, a mobile communication network, an indoor server, etc., thereby reducing expenses incurred in building an infrastructure and manufacturing a terminal.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A reference data for location estimation (RDLE) construction method for location tracking of a wireless device, the method comprising:
receiving, from the wireless device, access point (AP) scan data including a list of APs and signal intensities of the APs, and locations where the AP scan data is measured;
calculating reliabilities of the AP scan data for each of the APs at each of the locations; and
storing the RDLE including the calculated reliabilities, the AP scan data, and the locations that correspond to each other,
wherein a calculated value of the reliability of a detected AP, when a distribution of locations of the detected AP exceeds a predetermined distance, is lower than when the distribution is within the predetermined distance.

2. The RDLE construction method of claim 1, further comprising: if the calculated reliabilities do not satisfy a previously set condition, storing a list of APs that do not satisfy the previously set condition.

3. The RDLE construction method of claim 1, wherein the receiving of the locations comprises at least one of:
receiving a user's input of the locations;
obtaining the locations from a global positioning system (GPS); and
obtaining the locations from a location estimation engine.

4. The RDLE construction method of claim 1, further comprising:
dividing a region into a plurality of segments; and
storing the RDLE by allocating the RDLE to any one of the plurality of segments.

5. The RDLE construction method of claim 4, further comprising:
determining a segment to which newly provided AP scan data is allocated among the plurality of segments; and
allocating the newly provided AP scan data to the determined segment.

6. The RDLE construction method of claim 1, wherein the calculating of the reliabilities comprises: calculating the reliabilities in consideration of at least one or more of signal intensities of the APs included in the AP scan data, the number of detections of the AP scan data detected at the locations, detection time of the AP scan data, a distribution range of the APs included in the AP scan data, and a method of collecting the AP scan data.

7. A real time location tracking method of a wireless device, the method comprising:
receiving access point (AP) detection data (ADD) including a list of first APs and signal intensities of the first APs measured by the wireless device of which location is to be estimated; and
estimating a location of the wireless device by comparing reference data for location estimation (RDLE) including locations, a list of second APs corresponding to the locations, signal intensities of the second APs, and reliabilities of each of the second APs at each of the locations with the ADD, wherein the locations, the list of the second APs, and the signal intensities of the second APs are received from the wireless device,
wherein a calculated value of the reliability of a detected AP, when a distribution of locations of the detected AP exceeds a predetermined distance, is lower than when the distribution is within the predetermined distance.

8. The real time location tracking method of claim 7, wherein the RDLE comprises a plurality of subsets of RDLE (SRDLE),
wherein each of the plurality of SRDLE comprises a location, APs corresponding to the location, and signal intensities of the APs corresponding to the location.

9. The real time location tracking method of claim 7, further comprising:
collecting access point (AP) detection data (ADD) for database construction (ADDFD), wherein the wireless device performs the collecting; and
updating the previously stored RDLE by using the collected ADDFD, wherein the wireless device performs the updating,
wherein the ADDFD comprises a detection location of the wireless device, an AP list receivable at the detection location, and signal intensities of APs included in the AP list.

10. A location estimation server for constructing RDLE for location tracking of a wireless device, the location estimation server comprising:
an ADD receiver configured to receive AP scan data including a list of APs and signal intensities of the APs measured by the wireless device, and locations where the AP scan data is measured;
an RDLE reliability calculation engine configured to calculate reliabilities of the AP scan data for each of the APs at each of the locations; and
a location data construction engine configured to construct RDLE including the calculated reliabilities, the AP scan data, and the locations that correspond to each other,
wherein a calculated value of the reliability of a detected AP, when a distribution of locations of the detected AP exceeds a predetermined distance, is lower than when the distribution is within the predetermined distance.

11. The location estimation server of claim 10, further comprising: a database,
wherein, if the calculated reliabilities do not satisfy a previously set condition, the location data construction engine stores a list of APs that do not satisfy the previously set condition in the database.

12. The location estimation server of claim 10, wherein the RDLE reliability calculation engine calculates the reliabilities in consideration of at least one or more of signal intensities of the APs included in the AP scan data, the number of detections of the AP scan data detected at the locations, detection time of the AP scan data, a distribution range of the APs included in the AP scan data, and a method of collecting the AP scan data.

* * * * *